United States Patent [19]
Strauss et al.

[11] 3,751,973
[45] Aug. 14, 1973

[54] APPARATUS AND METHOD FOR PRESSURE TESTING CONTAINERS

[75] Inventors: Leo Strauss, East Rockaway, N.Y.; Gerard J. Voytek, Bridgeport, Conn.

[73] Assignee: Glass Containers Corporation, Fullerton, Calif.

[22] Filed: Feb. 8, 1971

[21] Appl. No.: 113,425

[52] U.S. Cl. .................................. 73/45, 73/49.2
[51] Int. Cl. ........................................ G01m 3/02
[58] Field of Search .................... 73/37, 45.1, 45, 73/45.2, 49.2

[56] References Cited
UNITED STATES PATENTS
3,010,310    11/1961    Rowe ............................................. 73/45
3,489,275    1/1970    Powers, Jr. ................................ 73/37 X

*Primary Examiner*—Richard C. Queisser
*Assistant Examiner*—Joseph W. Roskos
*Attorney*—Parmelee, Utzler & Welsh

[57] ABSTRACT

An apparatus and method for pressure testing of bottles wherein each bottle is subjected to a charge of pressurized fluid while being enclosed within individual peripheral cells of a rotating turret. Each cell is constructed such that the cell interior is sealed during testing while failure of a bottle to withstand a predetermined internal pressure, resulting in breakage of the bottle, effects immediate discharge of the broken bottle from the cell. The pressurized fluid, such as air, which is charged to the bottles during testing, is controlled by a central fluid distribution system with individual filling heads provided for each cell. Upon breakage of a bottle, the fluid flow to that cell is shut off. In order to increase efficiency of operation, fluid from bottles which have been charged for the predetermined test period is transferred to other bottles which are about to undergo testing. Means are also provided for testing each bottle for leakage.

31 Claims, 27 Drawing Figures

INVENTORS.
LEO STRAUSS &
GERARD J. VOYTEK
By Parmelee, Utzler & Welsh
Attorneys

INVENTORS.
LEO STRAUSS &
GERARD J. VOYTEK
By Parmelee, Utzler & Welsh
Attorneys

INVENTORS.
LEO STRAUSS &
GERARD J. VOYTEK
By Parmelee, Utzler & Welsh
Attorneys

INVENTORS.
LEO STRAUSS &
GERARD J. VOYTEK
By Parmelee, Utzler & Welsh
Attorneys

INVENTORS.
LEO STRAUSS &
GERARD J. VOYTEK
By Parmelee, Utzler & Welsh
Attorneys

INVENTORS.
LEO STRAUSS &
GERARD J. VOYTEK
By Parmelee, Utzler & Welsh
Attorneys

INVENTORS.
LEO STRAUSS &
GERARD J. VOYTEK
By Parmelee, Utzler & Welsh
Attorneys.

INVENTORS.
LEO STRAUSS &
GERARD J. VOYTEK
By Parmelee, Utzler & Welsh
Attorneys

INVENTORS.
LEO STRAUSS &
GERARD J. VOYTEK
By Parmelee, Utzler & Welsh
Attorneys

INVENTORS.
LEO STRAUSS &
GERARD J. VOYTEK

BY Parmelee Utzler & Walsh
Attorneys

INVENTORS.
LEO STRAUSS &
GERARD J. VOYTEK

BY Parmelee, Utzler & Welsh
Attorneys

APPARATUS AND METHOD FOR PRESSURE TESTING CONTAINERS

BACKGROUND OF THE INVENTION

The present invention provides an apparatus and a method for individually testing bottles to determine whether the bottles will withstand a predetermined pressure and also test them for possible flaws which could result in leakage of pressurized contents from the bottle following conventional sealing of the bottles.

In view of the concern of bottle manufacturers and users for the quality and safety of bottles used for pressurized contents, bottles have generally been visually examined by trained personnel to reject any bottle that is to be placed on the market which contains evidence of even possible defects. Because of the time consumed for such manual testing and the chance of human error in detecting flaws, some of which are not readily visible, attempts have been made to provide a mechanical and scientifically based device for testing bottles. Such devices have, however, failed to become commercially usable, probably because of either the cost of such a device or the difficulty in shielding both operating parts and personnel from the minute particles of glass which result from breakage of a bottle in the devices, while still enabling rapid movement of bottles either to filling devices or packaging stations.

The most pertinent disclosure of which we are aware is the device illustrated in U.S. Pat. No. 3,010,310. This device uses a series of test compartments positioned around the periphery of a turret, which compartments are open both at their outer side and bottom, with desired sealing effected at required times by stationary walls. Bottles fed to this device are suspended during testing by gripper jaws with valves used to inject pressurized air into each bottle at a specified pressure and for a specified time period. To our knowledge, this device has not achieved any marked commercial success and the container industry is still searching for an efficient and economical mechanical bottle tester.

BRIEF SUMMARY OF THE INVENTION

Bottles are tested for their capacity to withstand pressure by feeding them from a conveyor or other source into an opening in a stationary shield and into peripheral cells of a rotating turret. Each cell, as it revolves around the center axis of the turret, is completely sealed while pressurized air is forced into the bottle resting in the cell. Should the bottle explode, the cell bottom is opened to discharge glass fragments by gravity into a compartment in the base of the apparatus while means are provided to stop the flow of pressurized air to that cell. If the bottle withstands the predetermined pressure for a desired time, the air is exhausted from the bottle and the bottle discharged from the cell and through an opening in the shield to a discharge conveyor. Prior to exhausting the air from a good bottle, means are provided to transfer the pressurized air from that bottle to a further bottle that is to undergo testing thus reducing significantly the compressed air requirements of the system. In addition to checking for bottle weakness by using pressurized air, means are provided to test for leakage, such as that which would occur from chips in the lip of a bottle.

DETAILED DESCRIPTION

Figure 1:
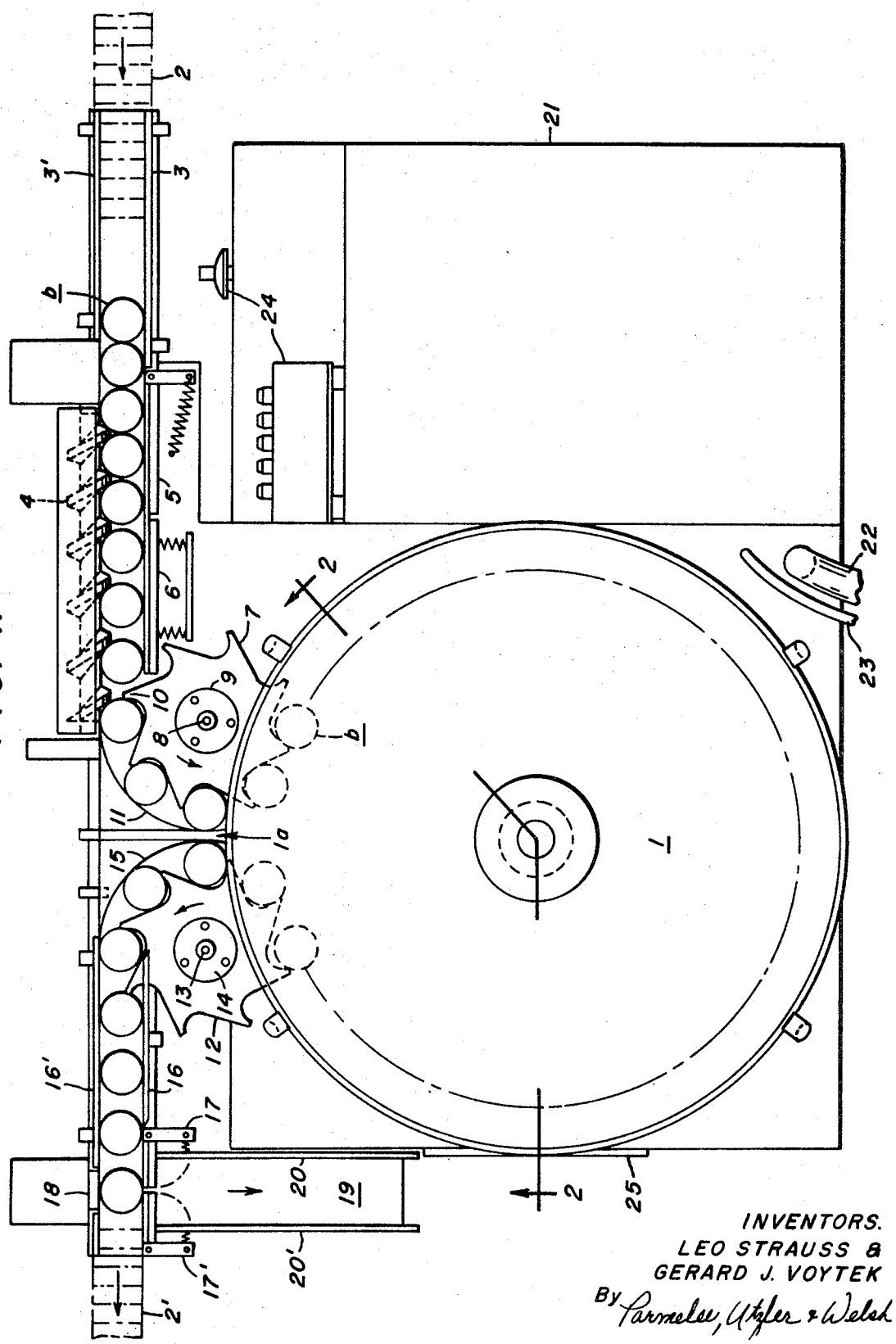
FIG. 1 is a top plan view of the apparatus of the present invention illustrating the containers from a source situated at the right side of the drawing being introduced into the apparatus, the containers being rotated clockwise with the turret and discharged to the left side of the drawing.

The present invention provides a novel means for high speed, high pressure, safe and economical testing of containers, especially glass bottles. Glass bottles from a source, such as a bottle production area or other source are inserted into individual cells of the apparatus herein described, tested under high pressure during travel around the periphery of the apparatus, and finally exited from the apparatus and removed from the immediate area for packaging, filling or other processing. Referring to FIG. 1, bottles *b* are fed from a source (not shown) to a conveyor 2, or other transfer device to the bottle tester 1 through an opening 1a. As illustrated, the bottles *b* are transported by the conveyor, while being guided by opposed spring mounted guide rails 3 and 3'. As the bottle movement continues, the bottles are brought into contact with a rotatable worm gear 4 and urged into contact with the worm gear by spring mounted guide rails 5 and 6 so as to space the bottles *b* a predetermined distance from each other and traverse them towards an ingress star wheel 7. The star wheel 7 is rotatably mounted on a vertical shaft 8 by a locking device such as a washer 9 and is arranged to rotate counterclockwise in the illustrated apparatus. Bottles *b* are traversed by the worm gear 4 into engagement with the arms 10 of the star wheel 7, and ride along a curved guide rail 11 for insertion through operning 1a and into the testing apparatus 1. As hereinafter described, the bottles are fed to individual cells of a rotatable turret and are carried clockwise almost 360°. Bottles which are not shattered by the subjection to pressurized air during testing are brought into contact with an egress star wheel 12. This star wheel 12 is rotatable about a vertical shaft 13 and held in place by securing means 14, being rotated counterclockwise as shown in FIG. 1. This motion urges the bottles, which ride along a curved guide rail 15 out of the tester and onto a removal conveyor 2'. The bottles, after exiting from the tester are retained upright by spring mounted guide rails 16 and 16'. The removal conveyor 2' carries bottles past pivotally mounted discharge gates 17 and 17' which are positioned opposite a pusher bar 18 which ejects bottles which have been found to be damaged or of low quality so as to be unable to hold pressure. These rejected bottles are deposited on a transverse conveyor 19, and contained by side walls 20 and 20' for discharge into a scrap container. Good bottles, those which have withstood the pressure test, and are able to retain pressure without leakage, are carried away by removal conveyor 2' for use. Controls for the testing apparatus are preferably located in an adjacent console 21, with an air inlet line 22 and electrical power line 23 provided, as are conventional control switches 24 for speed control and other operational sequences. The tester 1 has a door 25 for removing broken glass or cullet as later described.

The tester 1, comprises a base housing 26 (FIG. 2), a rotatable turret 27 having a series of cells *c* around its periphery and a stationary cylindrical wall or shield 28 enclosing the series of cells. Positioned on the shield and enclosing the upper portion of the apparatus is a removable cap or dome 29. The base 26 carries a plurality of adjustable legs 30 to enable positioning and leveling of the tester. The rotatable turret 27 is secured to a drive shaft hub 31 mounted on a vertically positioned hollow drive shaft 32, with bearing such as tapered roller bearings 33 provided to enable rotation of the turret in a horizontal plane. The hollow drive shaft is rotated by a gear 34 that is connected through a reduction gear 34a to a motor *m*, with the motor in turn, supplied with electrical power through electrical inlet 22. In order to collect and discharge broken glass from faulty bottles, a slanted false bottom 35 slants towards the cullet discharge door 25 and has a level collection portion 36 adjacent the door. The lower portion of drive shaft 32 is encased within a protective cover 37 to insulate it from minute glass particles, while the upper portion also has a protective sleeve 38, which sleeve is supported by base support members 39, carried by the base housing 26. The sleeve 38 has a flange 40 at its upper end to which a cam support 41 is secured, with the cam support having a raised surface portion 42 and anormal surface portion 43 which serve to position the bottom trap door of the cells as hereinafter described.

Figure 3:
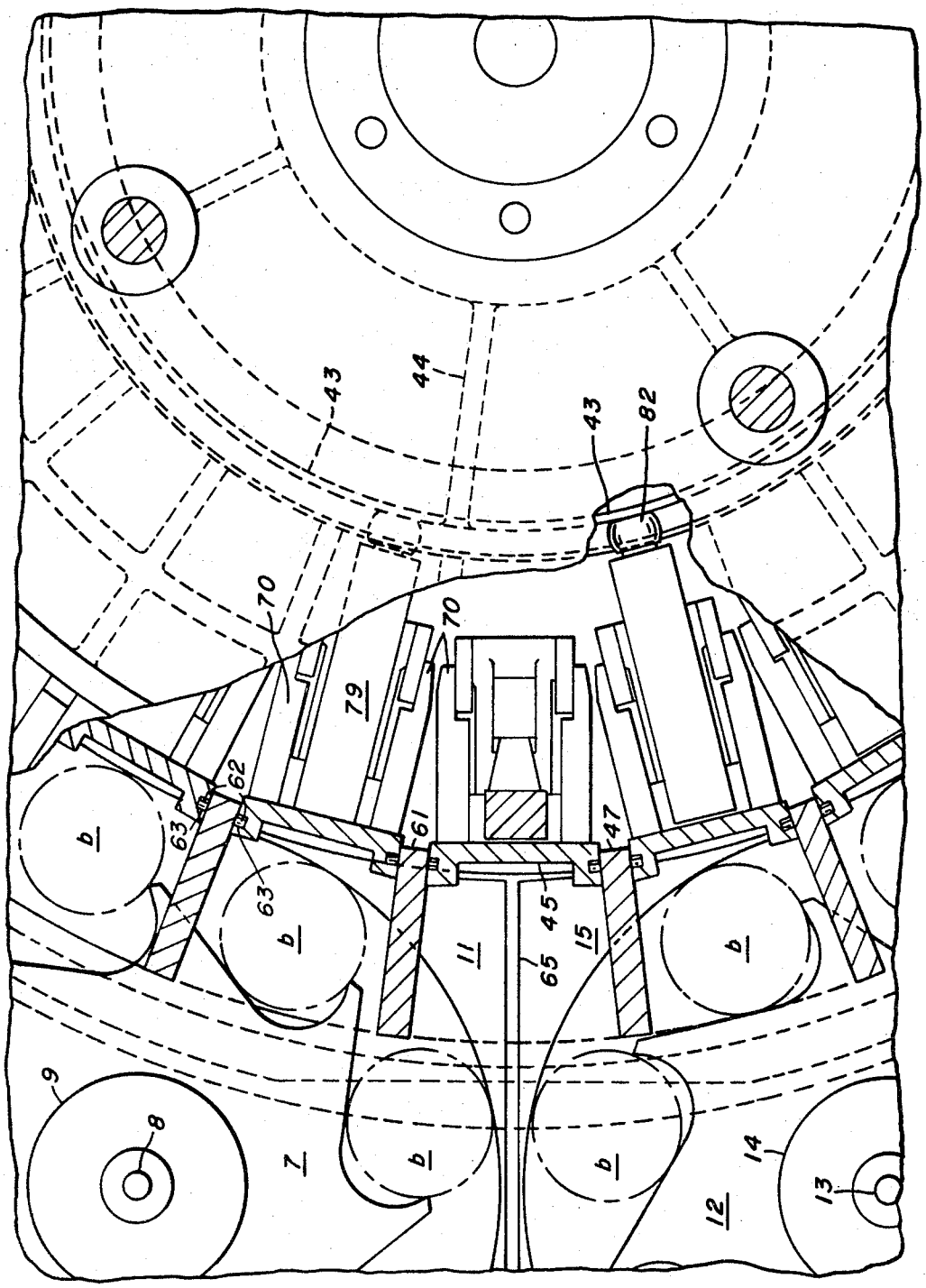
FIG. 3 is an exploded schematic view of the portion of the apparatus illustrated in FIG. 1, wherein the containers are admitted and discharged from the turret, with parts broken away to illustrate portions of the interior of the Turret.

The rotating turret 27 has a support member 44 comprising radially extending supports carried by the hub 31 which carry at their outer ends a series of cells *c*. The number of cells *c* around the periphery of the turret 27 can, of course, vary depending upon the desired size and throughput desired for any particular machine. As illustrated, the turret has a series of 25 cells, and the following description will relate to an apparatus having this number of cells. Each cell has a rear wall 45 which depends from the support 44, a top wall 46 extending outwardly from support 44, a pair of vertically movable side walls 47 and a floor 48 which opens into the base housing 26. The cells have no rotating outer wall, that is, a wall opposite the rear wall 45, but rather the shield 28 is positioned to serve as an outer wall at desired points. The rear wall 45, depending from support member 44 and illustrated in FIG. 4 has an opening 49 in the upper portion thereof with a screen 50 disposed in the opening and a baffle 51 spaced between the screen and a bottle resting in the cell. The top wall 46 attached to support member 44 and illustrated in FIG. 4 has an opening 49 in the upper portion thereof with a screen 50 disposed in the opening and a baffle 51 spaced between the screen and a bottle resting in the cell. The top wall 46 attached to support member 44 has an orifice 52 in the center for receiving a filling tube 53, with a sealing means such as an O-ring 54 to seal the top of the cell from the adjacent parts of the apparatus above the cell. The top wall 46 terminates in arc such that the outer edge 55 is flush with the shield 28. A sealing means such as a flexible rubber strip 56 extends around the inner surface 57 of the shield 28 along which the outer edge 55 slides so as to seal the junction between the top wall 46 and the shield 28. Side walls 47 extend from a position between rear walls 45 of adjacent cells and terminate at the inner surface 57 of the shield 28. These side walls, each of which separate adjacent cells from each other, are vertically movable as illustrated schematically in FIG. 5 and as is described hereinafter. These side walls 47 have at their upper outer end 58 a rolling cam 59, which cam follows a track 60 in the inner surface 57 of the shield 28 as the turret 27 rotates. The rear end 61 of the side walls has laterally extending dowels 62 which ride in a vertical groove 63 in the side surface of rear wall 45. The arrangement of the cam 59, the dowel 62, and groove 63 are such that the side wall 47 is reciprocal in a vertical plane when the track 60 changes its vertical position in the surface 57 of the shield 28. To completely enclose the cell, a cell floor is provided having a forked stationary support 64 and a pivotable trap door 65. As seen from FIGS. 3-5, the formed stationary support 64, which is secured to the bottom of the rear wall has a pair of arms 66 and 66' which extend outwardly to the inner surface 57 of the shield 28. Adjacent arms 66 and 66' of adjacent cell supports 64 mate with each other and form a support or base for a side wall 47 when the side wall is in lowered position so as to rest thereon. The arms 66 and 66' have tapered sides 67 and 67' which face the interior of a cell and thus eliminate sharp corners where glass particles could collect. A similar tapered portion 68 is provided on the bottom inner surface of the rear wall 45. In order to seal the surface between a side wall 47 and a cooperative pair of contiguous arms 66 and 66', a sealing strip 69 is carried by the bottom surface 70 of the side wall 47. The trap door 65, which closes the space between a pair of arms 66 and 66' of a forked support 64 is pivotally mounted and arranged to open into the area of the base housing 26. The door 65 is connected at one end to a brace 70 carried by the rear wall 45, through a link 71. One end of link 71 is attached to the brace by a pivot means 72 while the other end thereof is attached to the trap door 45 by pivot means 73. A second linkage between the trap door 65 and the rear wall 45 includes a V-shaped link 74, with one leg 75 of the V-shaped link pivotally attached through pivot means 76 to the trap door 65, the apex of the V-shaped link attached to a brace 77 on the rear wall by pivot means 78, and the other leg 79 of the V-shaped link extending inwardly towards the center of the apparatus and carrying a roller cam 80 at its end. A spring 81 is attached at one end to a post 82 on the rear wall 45 and at its other end to a lug 83 on leg 79 adjacent the roller cam 80, the spring 81 applying a force so as to urge the trap door downwardly. A bumper 84 is attached to leg 75 and contacts a stud 85 on the rear wall to facilitate positioning of the linkage.

This double linkage, through link 71 and link 74 in conjunction with the cam 80 enables opening and closing of the trap door 65 at desired times. When roller cam 80 is in contact with normal cam surface 43, the door 65 is maintained in a closed position against the force of the spring 81. The manual cam surface 43 however extends around the axis of the turret only in those sections where the trap door 65 is intended to be forced closed irrespective of whether or not a bottle is resting on the door. When a bottle is inserted in the cell and rests on the trap door 65, as will be explained hereinafter, a filling head 53 is pressed downwardly and rests on the lip of the bottle. This force F provides a closing torque on the trapdoor through the linkage arrangement because it will effect a clockwise movement about the linkage kinematic instant center at this closed position. Thus, even when the cam roller 80 is out of contact with a cam surface, as is provided in predetermined sections of the apparatus, the trap door will remain in closed position. This closing torque, in effect, "latches" the trap door in closed position against the counterclockwise moment of the spring 81. Should a bottle break, when pressurized air is injected into it, with the cell being opposite the raised cam surface 42, the closing torque (through the filling head 53 and bottle b) is relieved and the spring 81 automatically urges the leg 79 upwardly and the linked trapdoor open (as illustrated in dotted lines in FIG. 4) to effect deposition of the broken glass fragments into the base housing 28.

Figure 4:
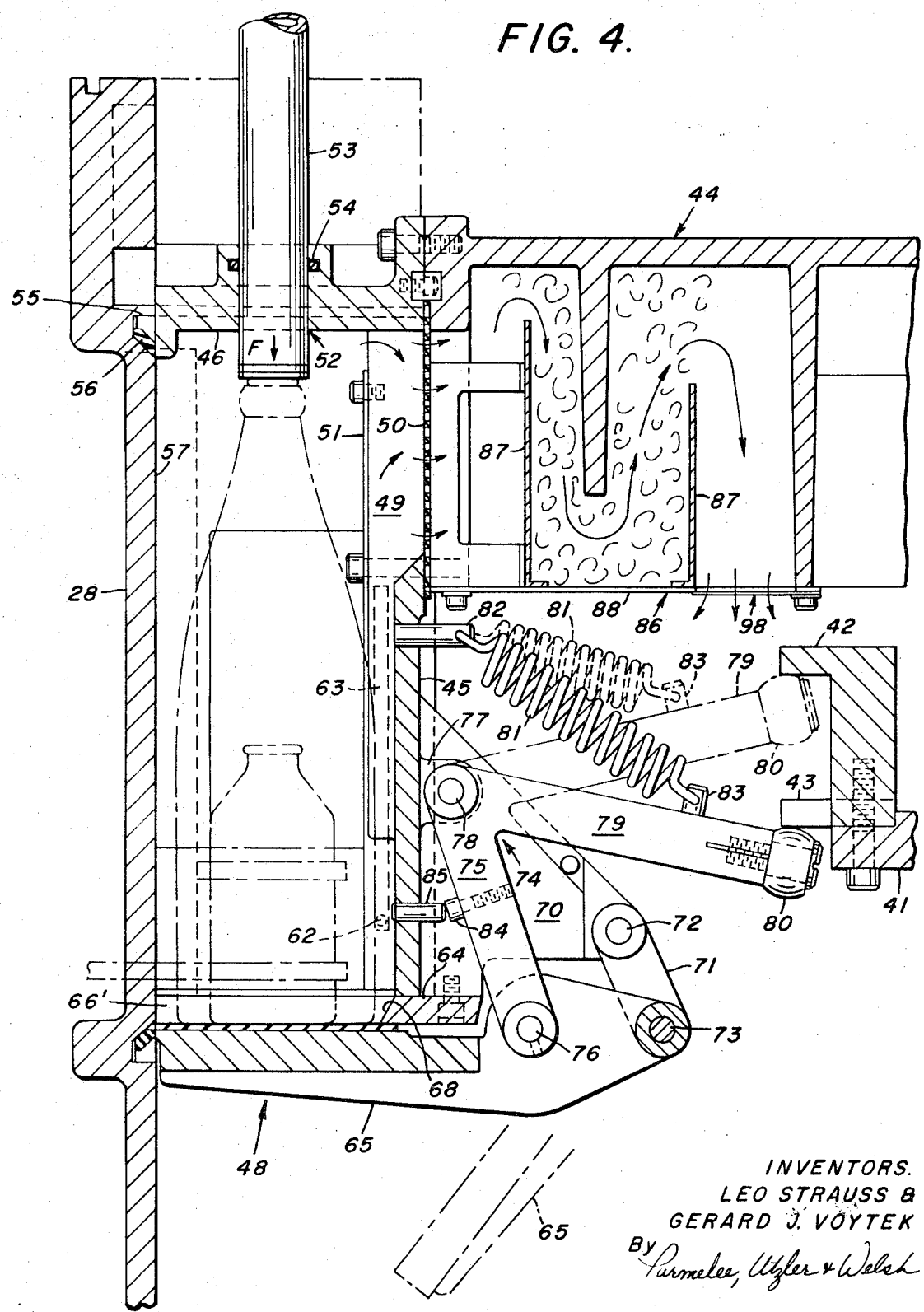
FIG. 4 is a partial cross-sectional view of a single cell of the apparatus in which containers are rested during testing, showing the baffle means associated therewith.
Figure 5:
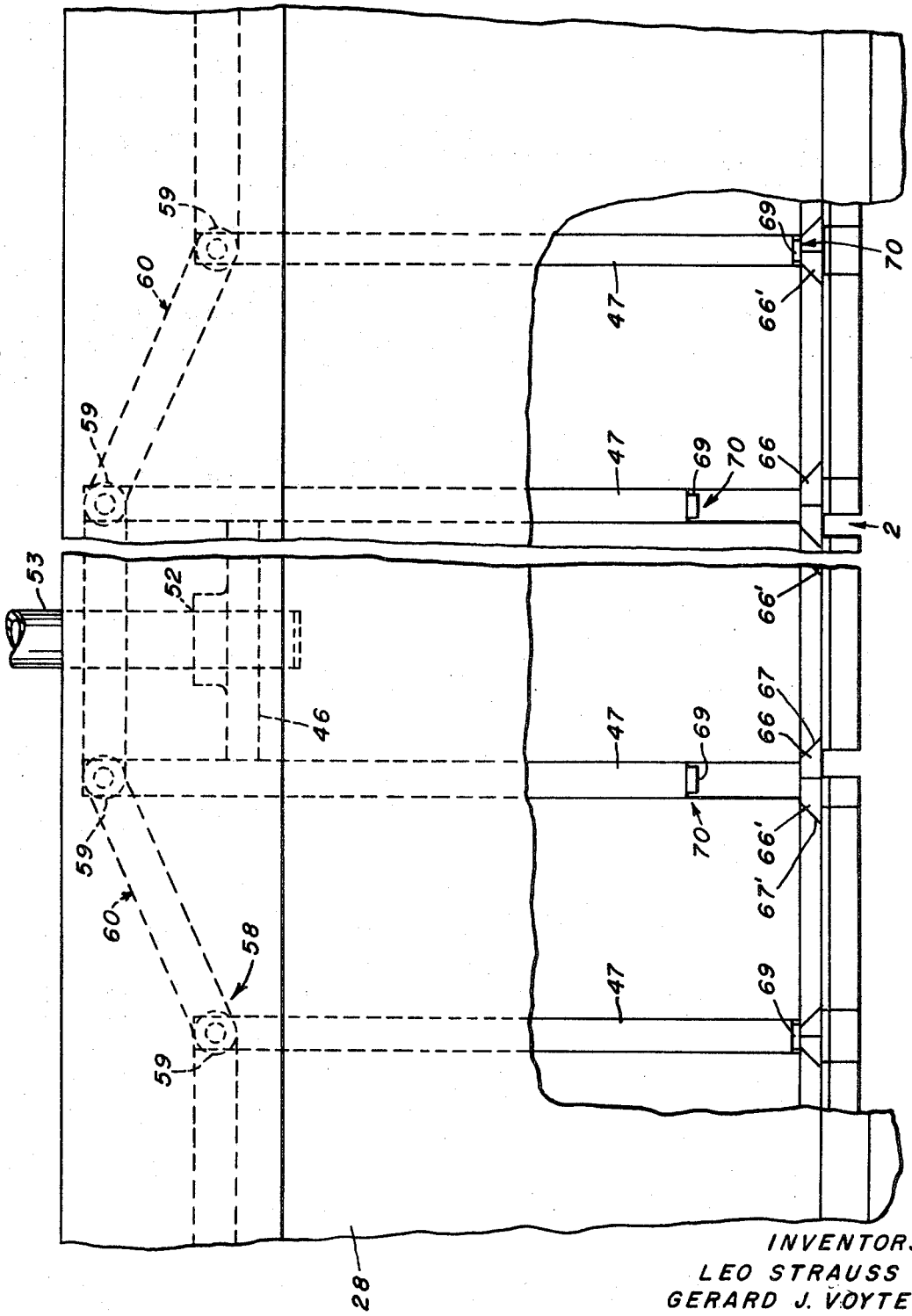
FIG. 5 is a schematic view of a series of cells, looking through the front opening of the cell, and showing the cam means used to raise and lower side walls of the cells.

In addition to providing for automatic discharge of glass fragments from the closed cell upon breakage of a bottle, a muffling system 86 is present to diminish the sound of the breakage which is similar to an explosion. The muffler system comprises a series of staggered baffles 87 within a housing 88, with a muffling material such as copper wool 89 or other sound absorbent and corrosion resistant material. As illustrated in FIG. 4, air from an exploding bottle in a cell c passes around baffle 51 through the screen 50 and then around the staggered baffles 87 through the sound absorbent material 89 and is finally discharged through an opening 90. In addition to muffling the explosion, the absorbent material retains powdered glass that might otherwise be discharged into the interior of the apparatus.

In order to test individual bottles for the ability to withstand pressurized contents, means are provided with each cell c for injecting pressurized air into the bottle resting in the cell. A filling head 91 (FIG. 6) for each cell c, has filling tube 53, which is slidably secured, at its upper portion, in a bore 92 of a block 93. The block 93 is secured, by cap screws 94 or other securing means to a support plate 95 which is attached to the apparatus. The bore 92 in block 93 has stepped enlarged portions 96 and 97, with the largest and uppermost portion 97 communicating with a port 98, which port is connected to a source of pressurized air. The filling tube 53, which has an air passageway 99 axially disposed therein carries at its lower end a threaded portion 100 to which there is releasably attached a hollow sealing plug 101, the plug 101 having secured to the bottom thereof a flexible sealing gasket 102 which contacts bottles during filling and testing operations. The tube 53, at its upper end, which is disposed within the uppermost portion 97 of the bore 92, has a flange 103. Adjacent this flange and communicable with the enlarged bore 97, an air hole 104 extends through the tube and connects the bore 97 with the air passageway 99. Disposed within the enlarged bore 97, and around the tube 53, there is a reciprocable spool 105, the spool movable in a vertical direction. The spool has a cut-out portion 106, which forms a spacing 107 between the upper portion of the spool and the tube 53. Sealing means such as O-rings 108 are provided on the inner and outer areas of the spool 105 to provide sealed but movable surfaces for the spool, while a sealing gasket 109 is seated on the upper surface 110 of the spool. A resilient means such as a spring 111 is situated within the portion 96 of the bore, which spring normally urges the spool in an upward position. A sealing means 112 is also provided in block 93 to provide for tight but slidable movement of the tube 53 within the block.

Figures 6, 7:
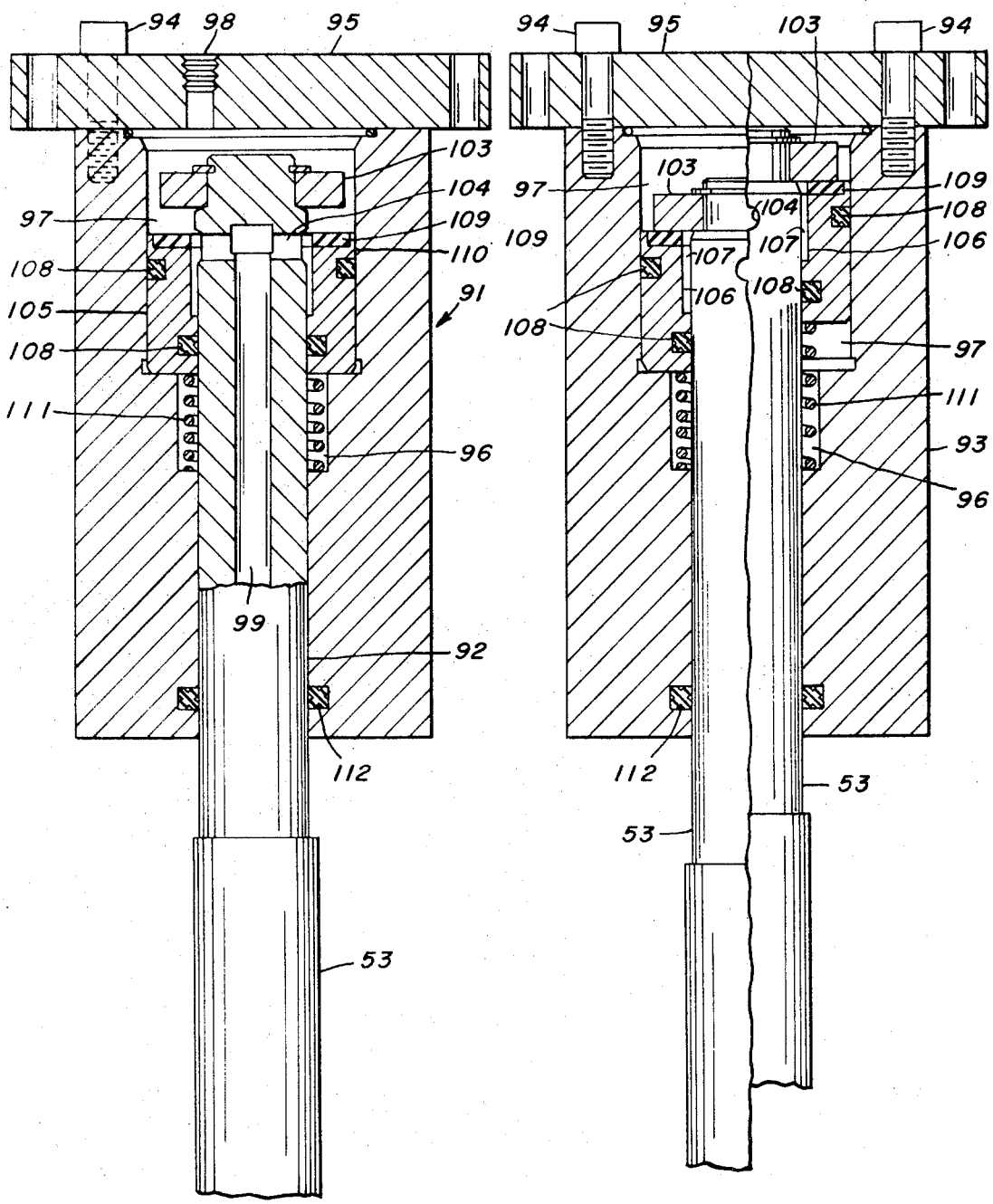
FIG. 6 is a partial cross-sectional view of a filling head assembly used in the basic embodiment of the present invention illustrating the filling head tube and valve means.
FIG. 7 is a schematic view of the filling head assembly shown in FIG. 6, with the left-hand portion of the drawing illustrating the position of various components upon breakage of a bottle, or absence of a bottle from the cell, and the right-hand portion of the drawing illustrating the tube in raised position as when pressurized fluid has been exhausted from a bottle that has been tested.
Figure 8:
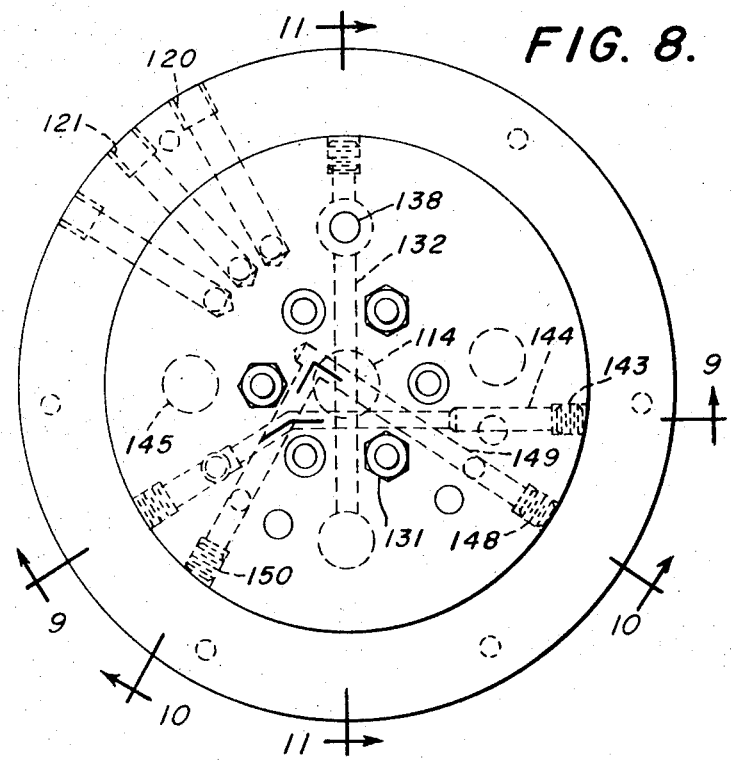
FIG. 8 is a view in partial cross section of the top of a central air distribution system used in the basic embodiment of the apparatus.
Figure 9:
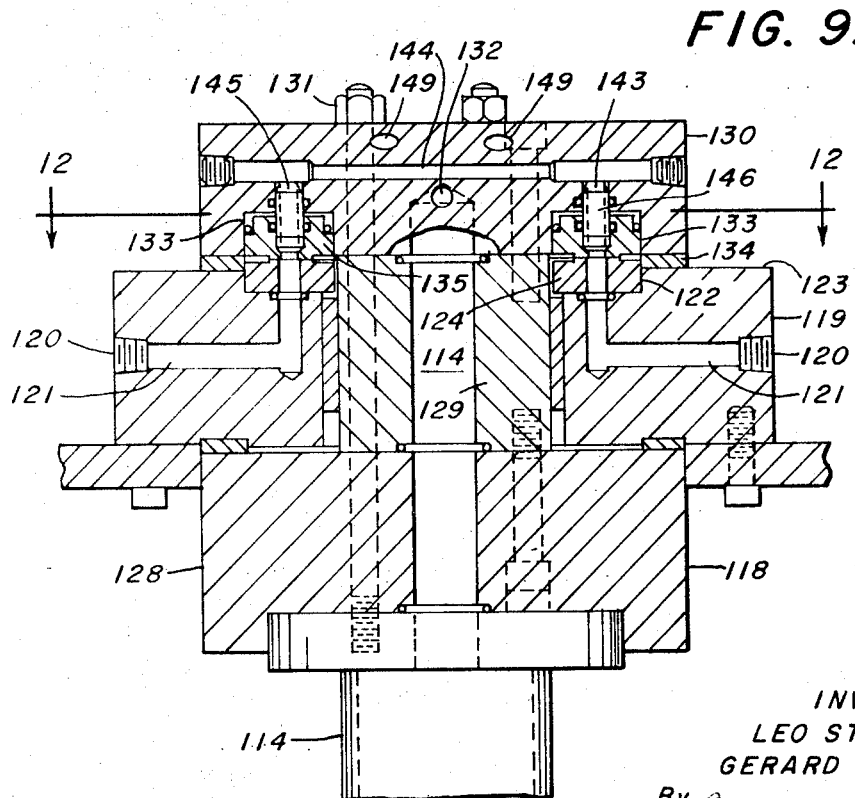
FIG. 9 is a view in partial cross-section of a central air distribution system taken along the line 9—9 of FIG. 8.

When in rest position, that is, in a position where there is no pressurized air charged to the filling head 91, the spool 105, as illustrated in the right-hand section of FIG. 7, is urged upwardly within enlarged bore 97 by the spring 111 and by urging the flange 103 upwardly retracts the filling tube 53 from its filling position. Such a rest position is used to raise the filling tube 53 in the cell c so as to enable insertion of a bottle into position for testing without danger of premature contact with the gasket 102. In this position, the spring 96 is extended while the spool 105 is urging the flange 103 of tube 53 into contact with the support plate 95. Upon positioning a bottle for testing within a cell, pressurized air is injected through port 98, which air impinges upon the flange 103 and drives the flange and tube 53 downwardly until it rests upon the lip of the bottle in the cell. The pressure is then increased to the desired testing pressure, such as 200 lbs. per sq. in., with the pressurized air flowing around the flange 103, through air hole 104 and air passageway 99 into the bottle interior, with the force of the pressurized air maintaining the sealing gasket 102 firmly against the bottle lip. The position of the various components of the filling head 91 during the pressurized sequence of operation is illustrated in FIG. 7. If the bottle is pressure resistant, the pressure will be maintained until the pressurized air is exhausted through air port 98, following a test period, and the tube retracted to rest position.

In the event that the bottle being tested has a flaw which results in breakage of the bottle when under pressure, the filling head enables shutting off of air to that cell. This occurence is illustrated in the left-hand section of FIG. 7, wherein upon breakage of the bottle, the tube 53 is forced downwardly, with the pressurized air impinging on the flange 103 immediately forcing the flange into contact with the sealing gasket 109. In this position, the air in enlarged portion 97 of the bore is unable to enter the space 107 of the spool and air port 104, so that no air is permitted to enter the passageway 99 of the tube 53.

Air to each of the individual filler heads 91, and thus to each bottle within a cell c, is controlled by a central air distribution system 113. Generally, the air distribution system 113 includes a distributor head and a rotatable manifold having a pair of contiguous air feed rings. Air from line 23 is charged to a pipe 114 which is stationary and extends from the base housing 26 upwardly through the hollow shaft 32 and extends to the upper portion of the apparatus. The air pipe 114 is secured in place by mounting means such as an arm 115, and a stay rod 116 which is supported by a brace 117 attached to protective cover 37, although other securing means are usable. As best illustrated in FIGS. 8 through 16, the air distribution system includes a stationary spool 118 and a rotatable manifold ring 119 which is rotatable about the axis of the spool. The manifold 119 contains a series of annular ports 120 around the outer edge of the manifold ring which connect through air holes 121 to a groove 122 on a planar surface 123 of the ring, which groove extends around the inner periphery of the ring 119. Seated within the groove 122 is an air outlet ring 124. The air outlet ring 124, shaped similar to a washer, as best seen by referring to FIGS. 13 and 14. This air outlet ring has a flat surface 125 which seats in the groove 122, while the other side has a raised shoulder 126. A series of ports 127 extend through the air outlet ring, which ports mate with the air holes 121 of the manifold ring 119, a port 127 being provided for each cell in the apparatus, herein illustrated with 25 such ports.

Figure 15:
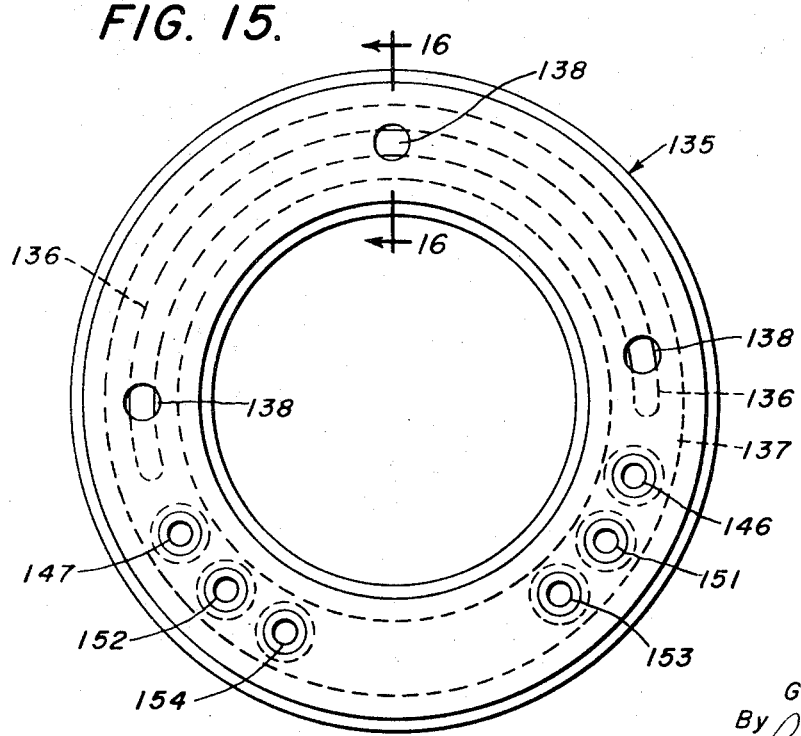
FIG. 15 is a top plan view of an air distribution ring used in the central air distribution system of the basic apparatus.
Figure 16:
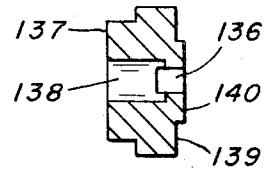
FIG. 16 is a cross-sectional view taken along the line 16—16 of FIG. 15.

The stationary spool, formed of three separable parts, a bottom hub 128, a central core 129 and an upper hub 130 is secured together by a bolt 131 or other fastening means, with the air pipe 114 extending through portions 128 and 129 and into the upper hub 130 where it communicates with a cross-channel 132 therein. The upper hub 130 has a groove 133 in a planar surface 134 thereof, around the inner periphery of the hub, the groove being complimentary with groove 122 in the manifold ring 119. Secured within the groove 133 is a stationary distributor ring 135 which controls the flow of air from pipe 114 and cross-channel 132 to the various ports 127 of the outlet ring 124. The distributor ring 135, as best illustrated in FIGS. 15 and 16 has a channel 136 cut in a face 137, with air inlets 138 leading to this channel, the opposite face 139 of the ring having a shoulder 140 which rides along shoulder 126 of the air outlet ring 124 when the two rings are placed in contact with each other. The distributor ring 135 is seated within the groove 133, with a plurality of spaced springs 141 (FIG. 11) used to force the distributor ring 135 against the air outlet ring 124. In addition, air from the cross-channel 132 impinges upon the face 137 of distributor ring 135 to urge it into contact with the air outlet ring 124.

Figure 11:
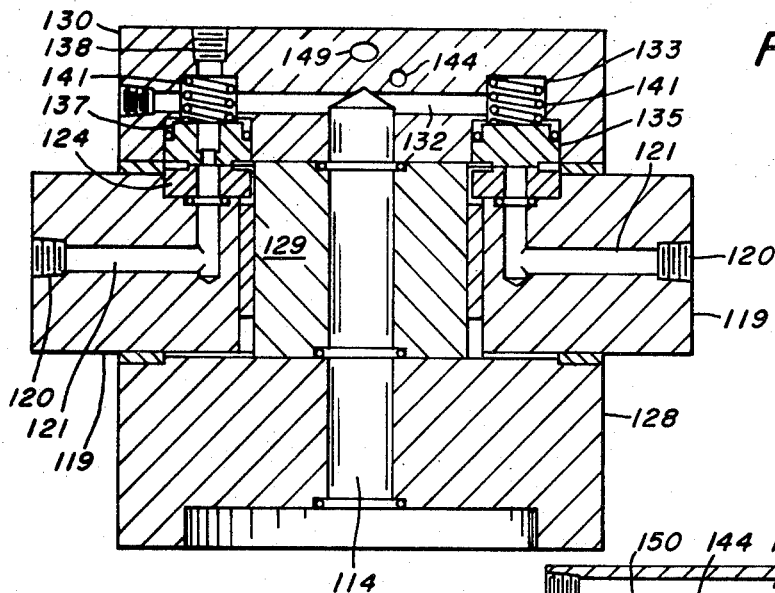
FIG. 11 is a view in partial cross-section of a central air distribution system 11—11 of FIG. 8.
Figure 10:
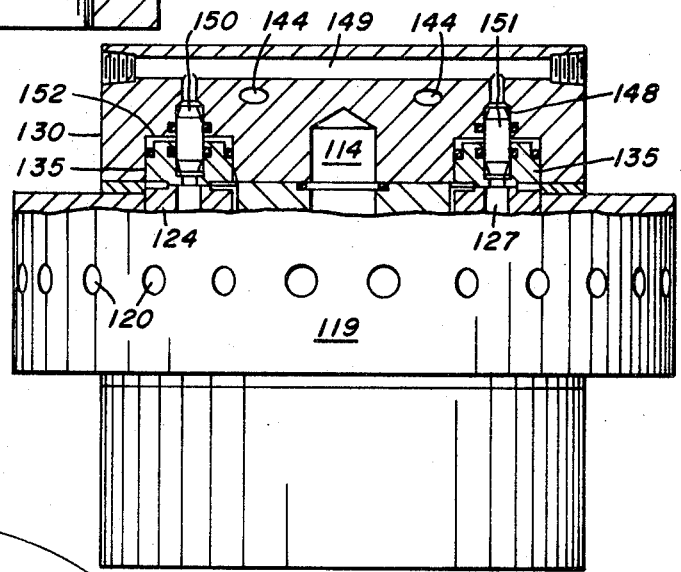
FIG. 10 is a view in cross-section of a central air distribution system taken along the line 10—10 of FIG. 8.
Figure 12:
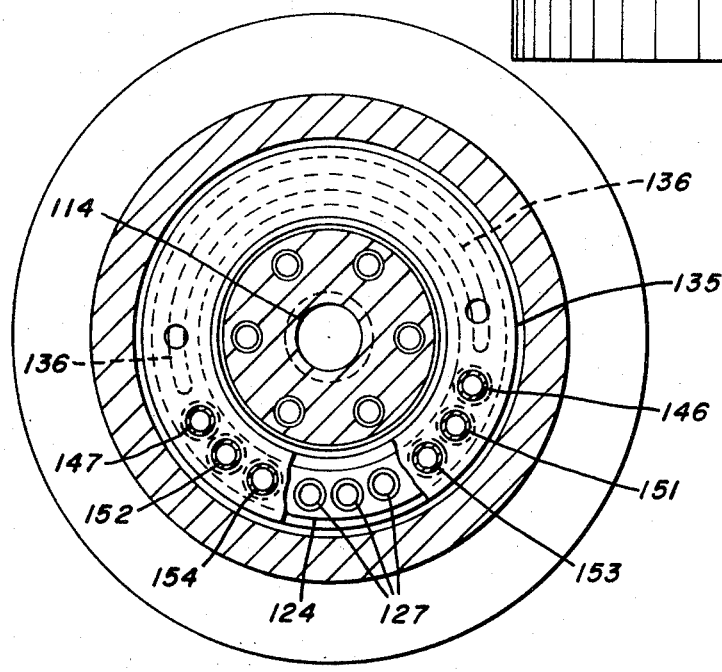
FIG. 12 is a partial cross-sectional view taken along the line 12—12 of FIG. 9, showing portions of the contiguous rings used to distribute air from a source to the individual cells of the apparatus.

With this arrangement, ports 127 of the rotatable air outlet ring 124 which are positioned within the arc of the channel 136 are subjected to pressurized air from air pipe 114, with this pressurized air being directed through cross-channel 132 to an air inlet 138 to the channel 136 and then through ports 127 which are in communication with the channel 136, directly through the communicating air holes 121 and ports 120 and then by connecting hoses 142 to the air filling heads 91. The retention means, the springs 141 and air pressure from cross-channel 132 on face 137, which urge the two rings 135 and 124 together, are best illustrated in FIG. 11.

An important aspect of the present invention is the means for re-using or capturing pressurized air from bottles which withstand the pressure test. This re-use provides significant savings in the pressurized air required by the apparatus over a continued use period. Such capturing of the air, upon exhaustion from bottles which have withstood the pressure test, provides a supply of pressurized air which may be used to operate auxiliary equipment associated with the apparatus or it may be used to initially fill bottles that are to undergo testing. In the illustrated embodiment, means are provided to thus exhaust air from a tested bottle to a bottle that is entering the test sequence. As illustrated, this means includes, for high pressure regeneration, a coupling 143 which is attached to a line 144, the other end of line 144 having a coupling 145, these couplings communicating with predetermined ports 146 and 147 (FIG. 12) of the distributor ring 135. A similar system, comprising a coupling 148, line 149 and coupling 150 are provided for low pressure regeneration, which couplings connect the line 149 with predetermined ports 151 and 152 in the distribution ring 135. The distribution ring also has an exhaust port 153 which opens to the atmosphere through a suitable air exit (not shown) and a clamping port 154, into which air from cross-channel 132 is charged through a pressure reduction device (not shown) so as to charge an initial surge of low pressure air to the air filling head at the time of initial clamping of the seat 102 of air tube 53 on a bottle that is about to be tested.

The operational sequence is best explained by following a bottle that is to be tested from its initial introduction into the apparatus 1, through its travel around the periphery of the turret and finally to discharge from the apparatus for further processing. As a bottle is engaged by an arm of ingress star wheel 7 and rides along the curved surface 11, it is pushed through the opening 1a in the shield 28 and by synchronizing the movement of the star wheel 7 and turret 27, the bottle is centered in a cell c. At this stage, the trap door 48 is locked in horizontal position through the contact of roller cam 80 and linkage 74, so that the trap door provides a flat surface upon which the bottle is to rest. The star wheel 7 is permitted to sweep through the cell because of the raised position of the side walls 47 of the cell through the action of the cam 59 which travels in raised portion of track 60 along the inside wall of shield 28. As the turret continues its clockwise movement, the cell c is moved out of position with respect to the star wheel 7 and opening 1a in shield 28. At this point, the side walls 47 are lowered through the action of cam 58 to close the sides of the cell. The bottle is thus completely enclosed within the cell, with the closure formed by rear wall 45, top wall 46, adjacent side walls 47, trap door 45 and the shield 28. Upon lowering of the side walls 47 and while continuing clockwise travel, air from clamp port 154 will be forced through the air inlet port 127 and flow by means of line 142 which is connected to the air filling head 91 of the particular cell c within which the bottle rests. The pressure exerted at this point, on the order of 200 pounds/sq. in. lowers the fill tube 53 until it contacts the bottle by means of gasket 102, to clamp the tube against the bottle opening. With the distribution ring 135 stationary and the air fill ring 124 rotating, the port 127 next communicates with low pressure regeneration port 152 and then with high pressure regeneration port 147. Provided there is a further bottle that has survived testing in the cells that are approaching the exhaust port 153 of the apparatus, pressurized air from the further bottle will be transferred to the bottle that is about to undergo testing. The cam 80, connected through linkage 74 to the trap door 45 on which the bottle is resting is, at this point in travel, out of contact with normal cam surface 43 and is spaced from the raised cam surface 42, with the trap door 45 being held in closed position by the force exerted on it by the bottle and filling tube 53. The bottle is then pressurized to full test pressure of about 200 lbs./sq. in. through communication of the port 127 with channel 136 of the distribution ring and it will be held at this pressure for a predetermined time of travel of the bottle around the turret. Should the bottle break at any time during this full test period, the force on the trap door 45 is released and the trap door 45 will automatically open to discharge the glass fragments into the false bottom of the base housing 26 for later removal. If the bottle survives the test period, port 127 will mate with high regeneration exhaust port 146 and a portion of pressurized air will be released to a subsequent test bottle. The pressurized air will next be released even further by mating of the port 127 with low pressure exhaust port 151. Upon completion of the test and transfer of pressurized air to a subsequent bottle, the remaining enclosed air in the bottle will be exhausted through exhaust port 153 to the atmosphere. At this position of travel, the cam 80 is again brought into contact with normal cam surface 43 so as to lock the trap door in upward position, while the side walls 47 of the cell are raised through cam 59. The bottle is then engaged with egress star wheel 12 as it sweeps through the cell and the bottle rides along the curved surface 15 and discharged from the apparatus 1 through the opening 1a in the shield 28.

Figure 17:
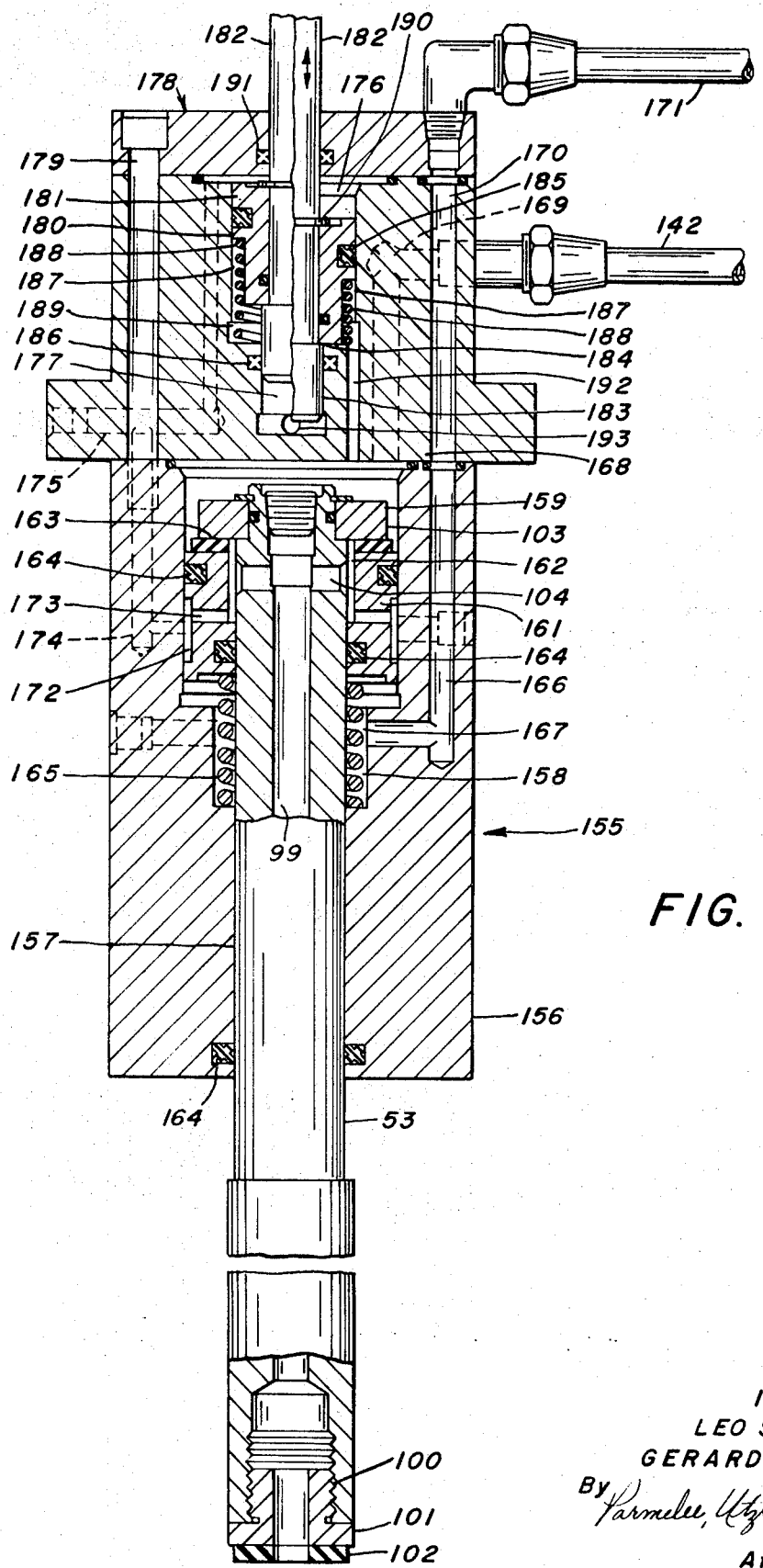
FIG. 17 is a partial cross-sectional view of a further embodiment of a filling head assembly used to detect leaking containers, with the upper left-hand portion of the drawing illustrating the position of components therein when a leaking bottle has been tested, and the upper right-hand portion of the drawing illustrating the position of components therein when a good bottle has been tested.
Figure 18:
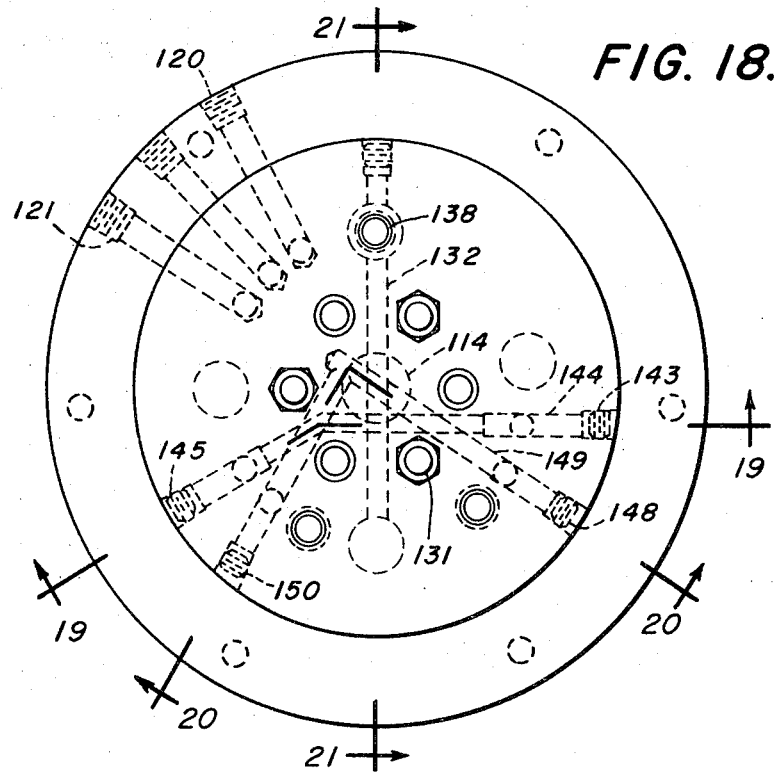
FIG. 18 is a view in partial cross-section of the top of a central air distribution system used in a further embodiment of the apparatus wherein containers are tested for leakage.
Figure 19:
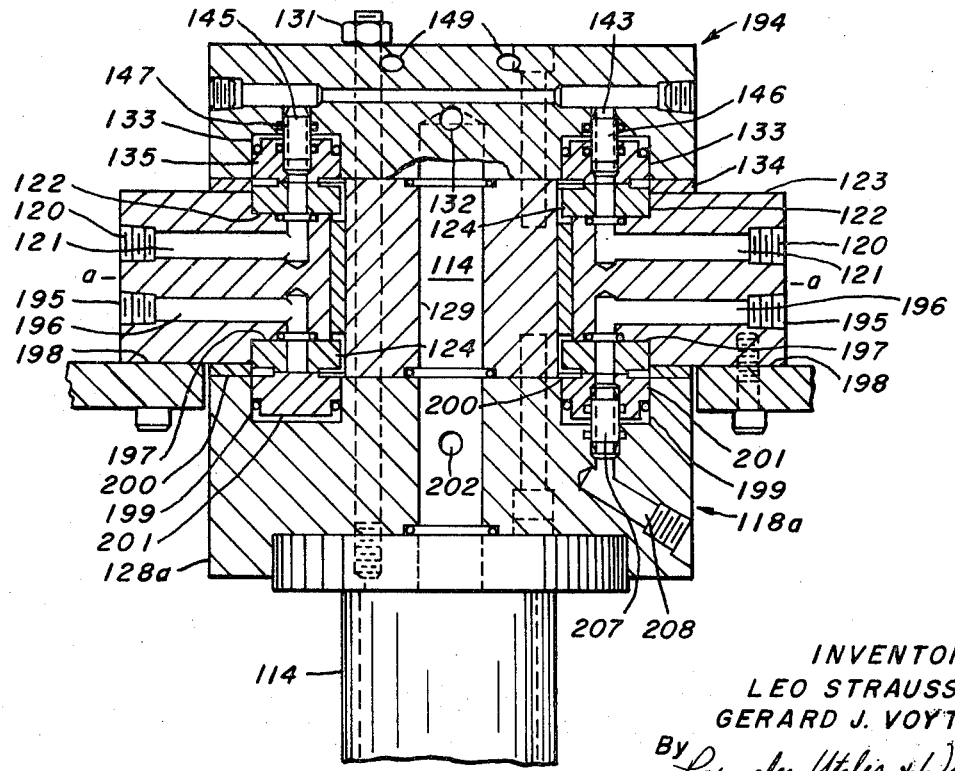
FIG. 19 is a view in partial cross-section of a central air distribution system taken along the lines 19—19 of FIG. 18.
Figure 21:
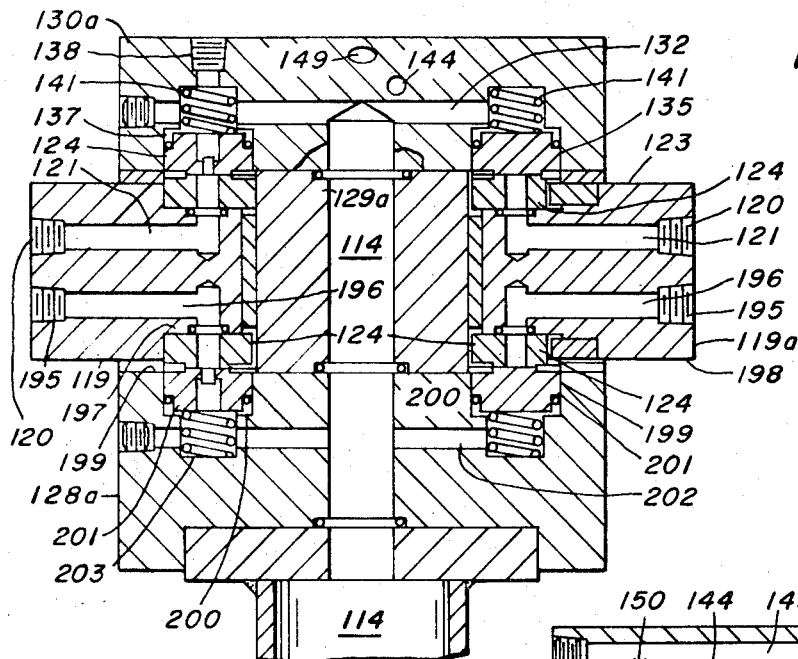
FIG. 21 is a view in partial cross-section of a central air distribution system taken along the lines 21—21 of FIG. 18.
Figure 20:
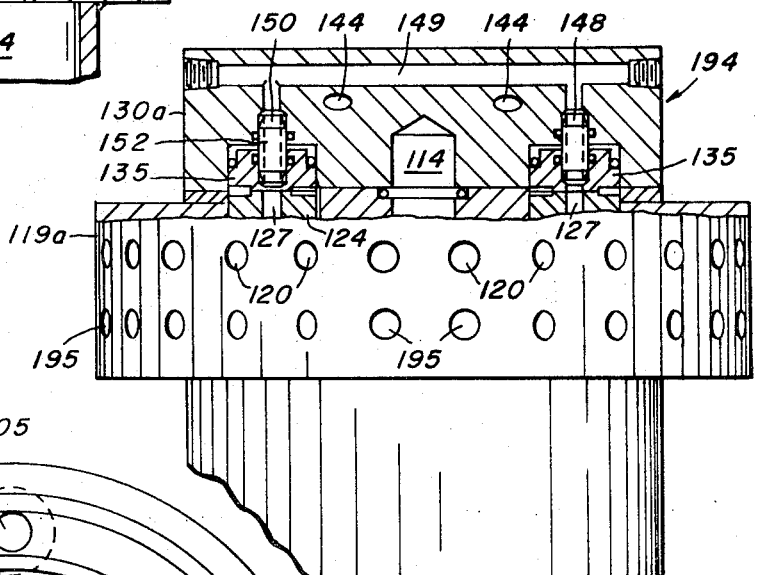
FIG. 20 is a view in partial cross-section of a central air distribution system taken along the lines 20—20 of FIG. 18.

In a further embodiment of the invention, the bottles, in addition to being tested for their ability to contain pressurized fluids without breaking, are tested for leaks which might release contents without breakage of the bottle. Such leaks are generally the result of chips or flaws in the lip of the bottle but may also be caused by other defects in the bottle itself. The means for testing for leakage comprises an alternate filling head assembly and air distribution system. As shown in FIG. 17, the leak tester filling head 155 comprises a block 156 having a bore 157 in which the filling tube 53 is slidably secured. The filling tube 53 is constructed as the tube 53 hereinbefore described, with an axial air passageway 99, a lower threaded portion 100 to which there is removably secured a hollow sealing plug 101 and flexible gasket 102, and having at its upper portion a flange 103 and adjacent air hole 104. The bore 157 has stepped enlarged portions 158 and 159, with the uppermost and largest portion 159 having an air inlet 160. Around the upper portion of the tube 53 there is disposed a reciprocable spool 161, the spool being movable in a vertical direction, and having a cut out area 162 adjacent the tube 53 in its top portion. Around the top of the spool 161 there is a sealing gasket 163. Sealing means 164 are provided on the outside and inside faces of the spool, as well as around the tube 53 in the block 156 so as to provide sealed surfaces while still enabling movement of the tube 53 and spool 161. Situated within the portion 158 of base 157 is a compression spring 165 which urges the spool 161 upwardly in its normal position. The spring 165, spool 161, and flange 103 of tube 53 as described with the basic apparatus previously detailed, so as to admit air to the air passageway 99 and thus to a bottle to be tested. Pressurized air admitted through inlet 160 impinges upon flange 103 to drive tube 53 downwardly until gasket 102 rests on a bottle. The air then enters space 162, air hole 104 and passageway 99 in tube 53 and flows into the bottle under a desired pressure. As previously described, if a bottle is not situate below tube 53 or if a bottle breaks, the flange 103 will be forced into contact with gasket 163 of spool 161 to shut off air to the passageway. Following exhaustion of air from the uppermost portion 159 of base 157, the spring 165 urges the spool 161 and flange 103 upwardly, thus raising the tube 53, so that the next bottle to be tested can be positioned below the tube 53.

To provide for testing a bottle for leakage a channel 166 and a second air inlet 167 are provided which communicate with the portion 158 of the bore in block 156. A cap 168 is secured to the top of the block 156 and channels 169 and 170 are provided therein, with channel 169 being connected at one end to an air line 142 and at its other end to air inlet 160 of block 156, while channel 170 is connected at one end to a further air line 171 and at its other end to channel 166 in block 156. The spool 161 has an annular groove 172 around its outer surface and an air hole 173 connecting the groove 172 with the lower region of cut-out portion 162 in the inner surface of the spool 161. An air transfer channel 174 is cut in block 156, which channel connects the groove 173 with a second air transfer channel 175 in the cap 168. The cap 168 has a hollowed-out portion 176, the bottom region 177 of which is of a narrower cross-section than the upper portion thereof. A plate 178 closes the hollowed-out portion 176 from the atmosphere and a securing means, such as bolts 179, secure the plate 178, cap 168 and block 156 into engagement with each other. Within the hollowed portion 176 there is a piston 180 having a flange 181 around its upper portion and a rod 182 extends upwardly therefrom, which rod extends through the plate 178, and has a depending portion 183 with a shoulder 184 extending below the piston into the bottom region 177 of hollowed out portion 176. Sealing means 185 on the outer surface of the piston 180 to provide a tight but slidable fit for the piston; as is a sealing means 186 around the bottom portion 183 of rod 182. A groove 187 around the lower outer surface of piston 180 encloses a compression spring 188 between the upper surface of the groove and the bottom 189 of the hollowed-out portion 176. A retaining ring 190 secures the rod 182 to piston 181 for common movement while a seal 191 in plate 178 prevents leakage of pressurized air from the hollowed-out portion 176 to the atmosphere. An air passage 192 connects the groove 187 of the piston 180 with enlarged bore 159 of the filling head. A port 193 in the lowermost section of 177 of hollowed-out portion 176 admits atmospheric air to this section.

Figure 13:
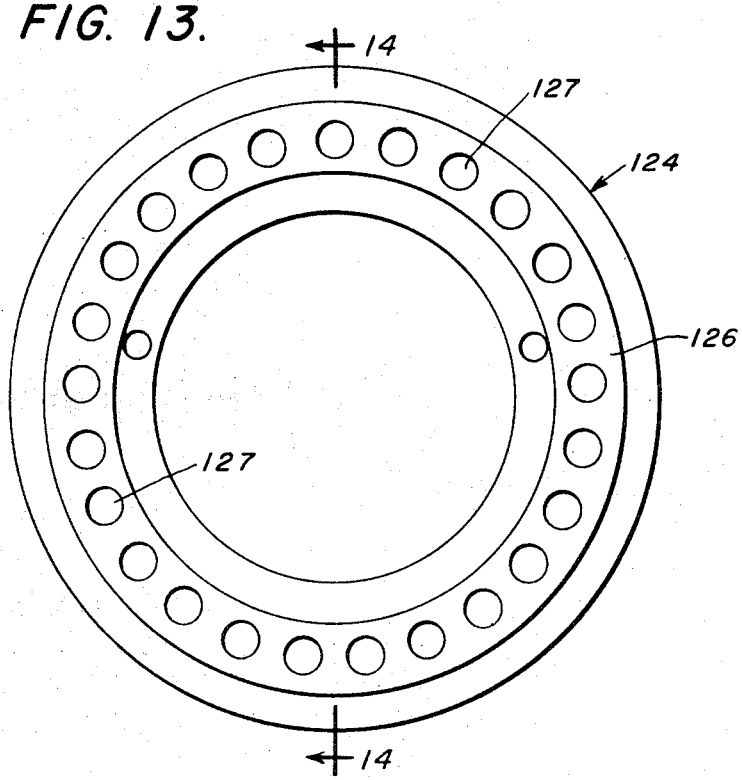
FIG. 13 is a top plan view of an air outlet ring used in the central air distribution system of the apparatus.
Figure 14:
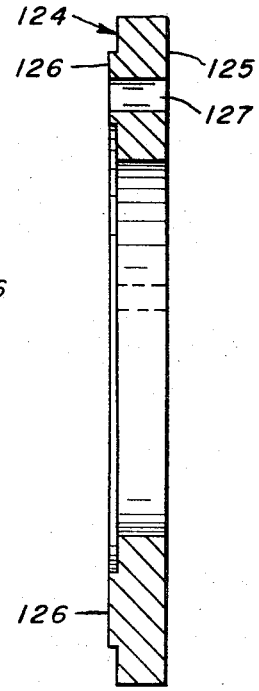
FIG. 14 is a cross-sectional view taken along the line 14—14 of FIG. 13.

The operation of the leak tester filling head involves the use of pressurized air which is admitted separately from lines 142 and 171. As illustrated, air is first injected through line 142 to impinge upon flange 103, force tube 53 downwardly and to feed pressurized air to a bottle for testing. Upon pressurizing of the bottle, pressurized air is then injected through line 171, channel 170 and port 167 into the bore 158, which air causes upward movement of the spool 161 until the spool, with flange 163 contacts flange 103 as shown in FIG. 17. In this position, air from bore 159 can no longer reach the air hole 104, so that no pressurized air from either line 142 or line 171 is able to enter the passageway 99. Pressurized air which is in the bottle, however, will flow through air hole 104, groove 162 and air hole 173 to the groove 172. From groove 172, the air flows through air transfer channels 174 and 175 to the hollowed-out portion 176 of the cap 168. This pressurized air, on the order of 200 lbs./sq. in. forces piston 180 and rod 182 downwardly and will retain them in downward position so long as the pressure is maintained. Thus, the pressure exerted upon the top of the piston 180 via the surface area present is sufficient to overcome the upward biasing action of the air from pore 159 which impinges upon the bottom of piston 180 through channel 192 as well as the force exerted by spring 188. This position is illustrated in the top right-hand section of FIG. 17. Should air leak from the bottle, the pressure within the bottle and thus within hollowed-out portion 176 will decrease, so that the piston 180 and rod 182 will be forced upwardly by the biasing forces. By activation of a signaling means (not shown) by the upward movement of the rod 182, it is readily determined whether or not a bottle has such a flaw as would result in leakage of pressurized contents therefrom, although the bottle may not be broken by the pressure. This position is illustrated in the top left-hand section of FIG. 17. The signaling means is then used to activate the pusher ram 18, by a synchronized delay mechanism so that when the defective bottle has been discharged from the apparatus 1, the ram 18 will effect removal of the bottle from conveyor 2' and onto the transverse conveyor 19 for discarding. The central air distribution system 194 for controlling the air to each of the individual leak tester filling heads 155 is similar to the air distribution system 113 described for the basic apparatus except for the provision of means for controlling air flow to hoses 171 of the heads 155. The air distribution system 194 is best illustrated in FIGS. 18 to 22, and, as seen therein, the portion of the system 194 above line a—a corresponds to the portion of the system 113 that is above lines b—b as illustrated in FIGS. 8 to 16 and hereinbefore described. The system 194 includes a stationary spool 118a and rotatable manifold ring 119a. The manifold ring 119a in addition to having annular ports 120 therein also contain a complimentary series of annular ports 195. The ports 195 connect through air holes 196 to a groove 197 in the planar surface 198 of the ring opposite that to which air holes 121 connect. The distribution ring 119a thus has a double series of annular ports 120 and 195 and a pair of grooves 122 and 197 around the inner periphery of the ring. Within each of the grooves 122 and 197 there are seated an air outlet ring 124, as illustrated in FIGS. 13 and 14, with ports 127, one port in each ring being provided for each cell in the apparatus.

Figure 22:
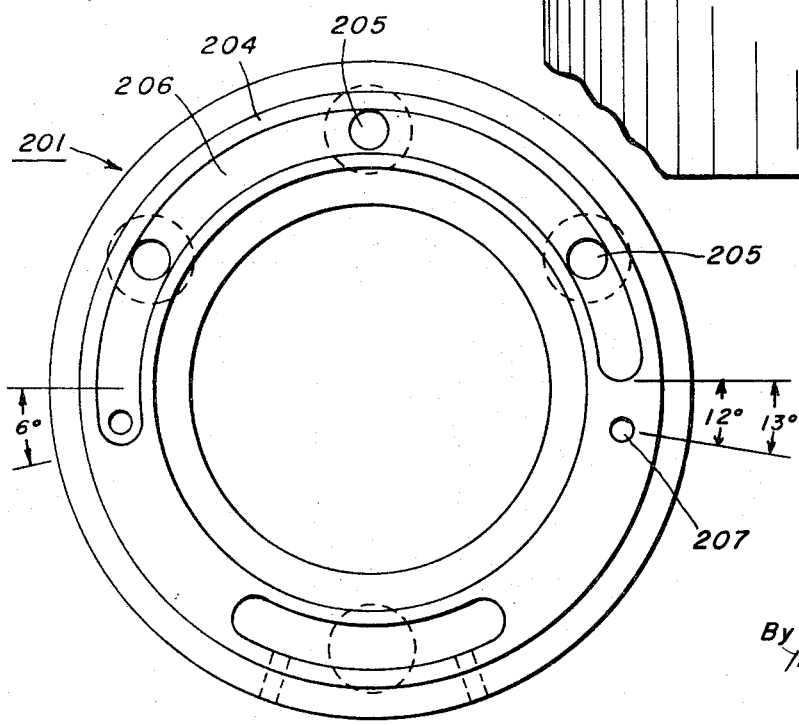
FIG. 22 is a top plan view of leak tester air distribution ring used in the further embodiment of the apparatus.

The stationary spool, as with the first embodiment described, comprises three separable parts secured together by a bolt 131 or other fastening means. These three parts comprise a bottom hub 128a, a central core 129a and an upper hub 130a. The central core 129a and upper hub 130a are constructed and arranged as are core 129 and hub 130 hereinbefore described, while the bottom hub 128a is modified. The bottom hub 128a carries a groove 199 in a planar surface 200, which groove seats a leak tester distributor ring 201, the groove 199 being complimentary with groove 197 in the surface 198 of manifold ring 119a. A cross-channel 202 is provided in bottom hub 128a which communicates with air pipe 114 and feeds air to the groove 199, which air impinges upon the leak tester distribution ring 201 and, with springs 203 urge the ring 201 into contact with the contiguous air outlet ring 124. The leak tester distributor ring 201, as illustrated in FIG. 22 has a raised shoulder 204, with air inlets 205 therethrough and a channel 206 which feeds air, at predetermined positions, into the ports 127 of the contiguous air outlet ring 124. An exhaust port 207 is provided in the ring 201 which provides for exhausting of air from the leak test filling head 155 through an exhaust line 208 in bottom hub 128a when the port 127 communicating with such head reaches the exhaust port position, following the predetermined time for testing of the bottle for leaks.

Figure 23:
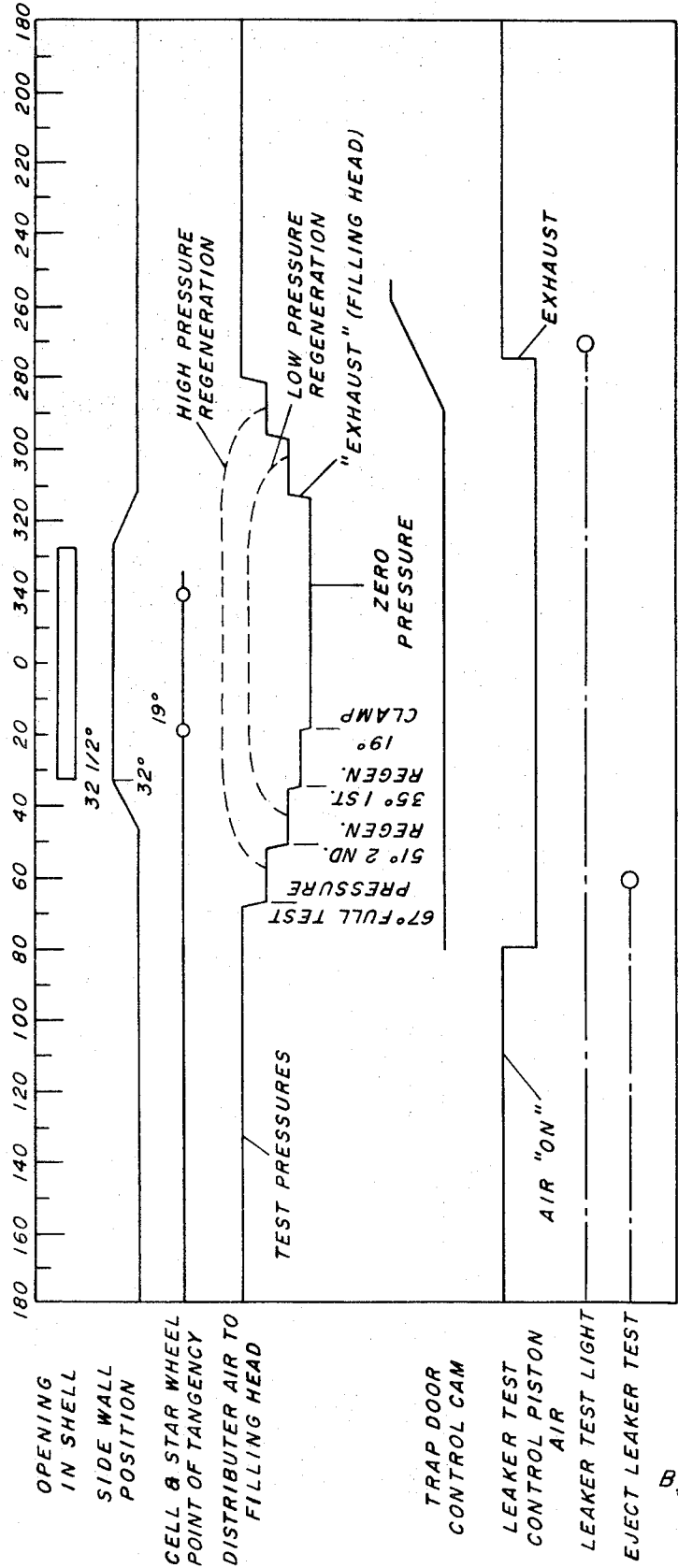
FIG. 23 is a timing chart graphically illustrating the position of components of the apparatus of the present invention during a testing cycle.
Figure 24:
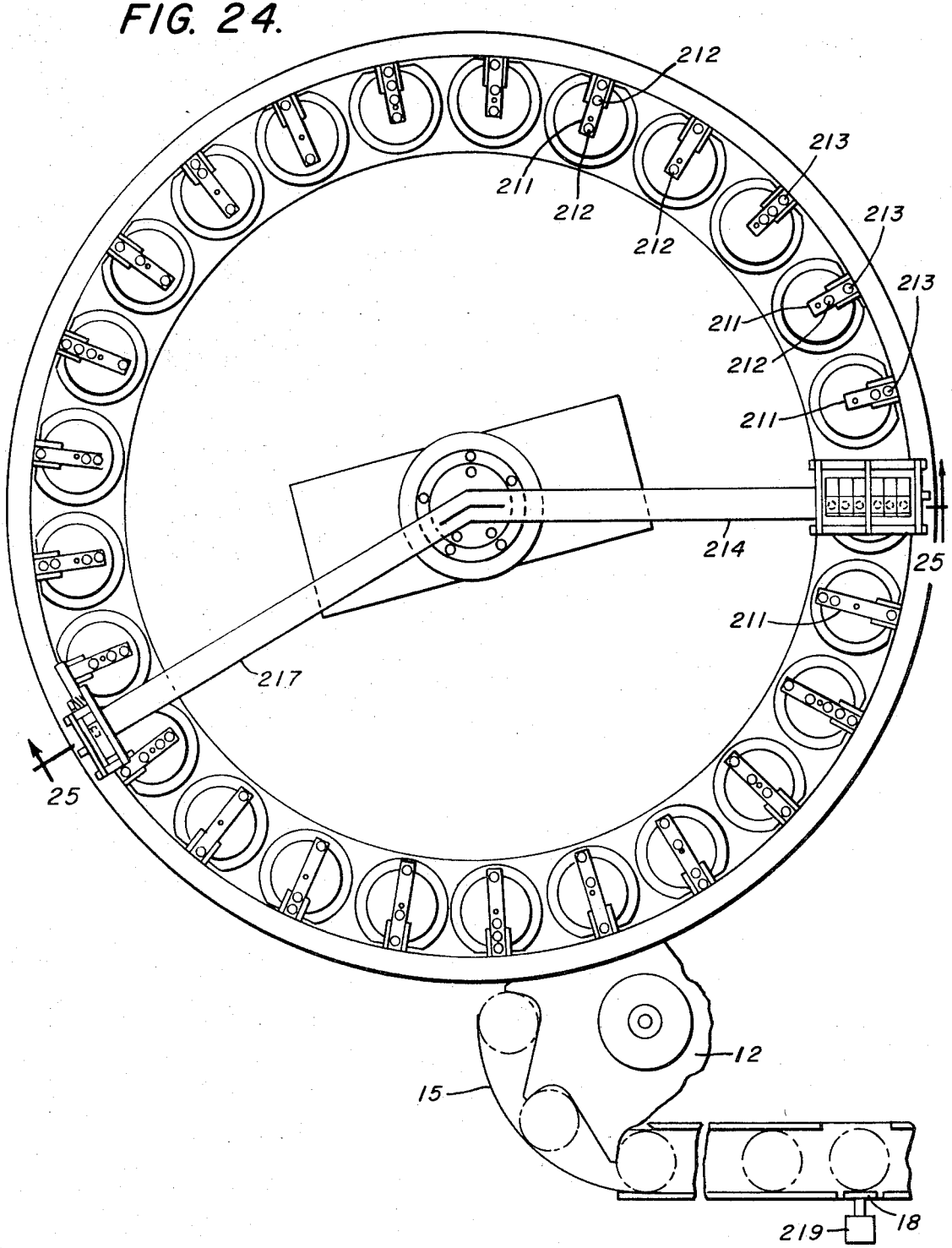
FIG. 24 is a top plan view illustrating a leaker testcell identification and ejection system usable with the apparatus of the invention.
Figure 25:
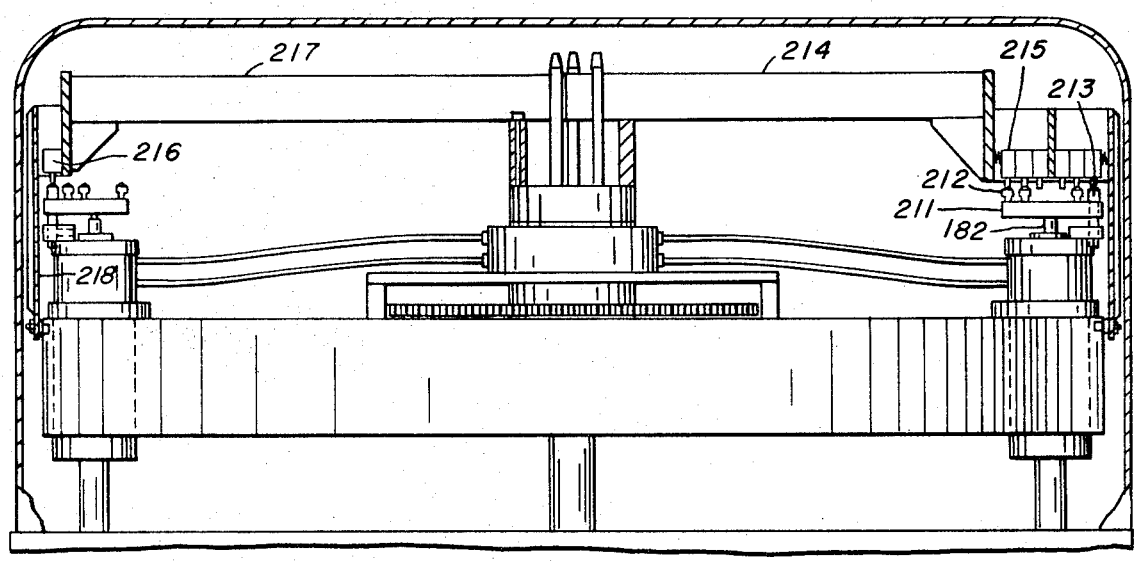
FIG. 25 is a view in partial cross-section taken along lines 25—25 of FIG. 24.
Figure 27:
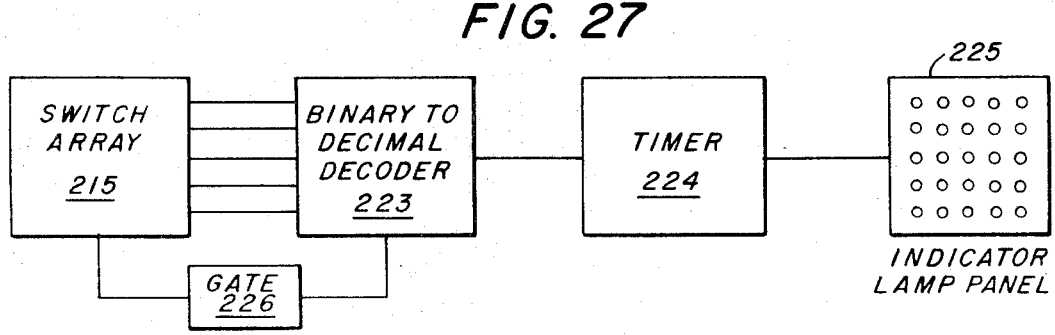
FIG. 27 is a block diagram of the leaker test cell identification system.

The graphic representation in FIG. 23 describes the operation of the bottle tester by means of a timing chart based upon the 25 cell device described previously. With the 0° reference on the chart representing the center of the opening 1a in the shield 28 and with movement of a bottle throughout the arc of the turret being clockwise, the graphic illustration shows the operation of various moving parts during the travel of a bottle. The chart illustrates the point of movement of the side walls 45, cam locking of trap doors 65, and the points of injection and exhaustion of air to a leak tester filling head assembly.

Figure 2:
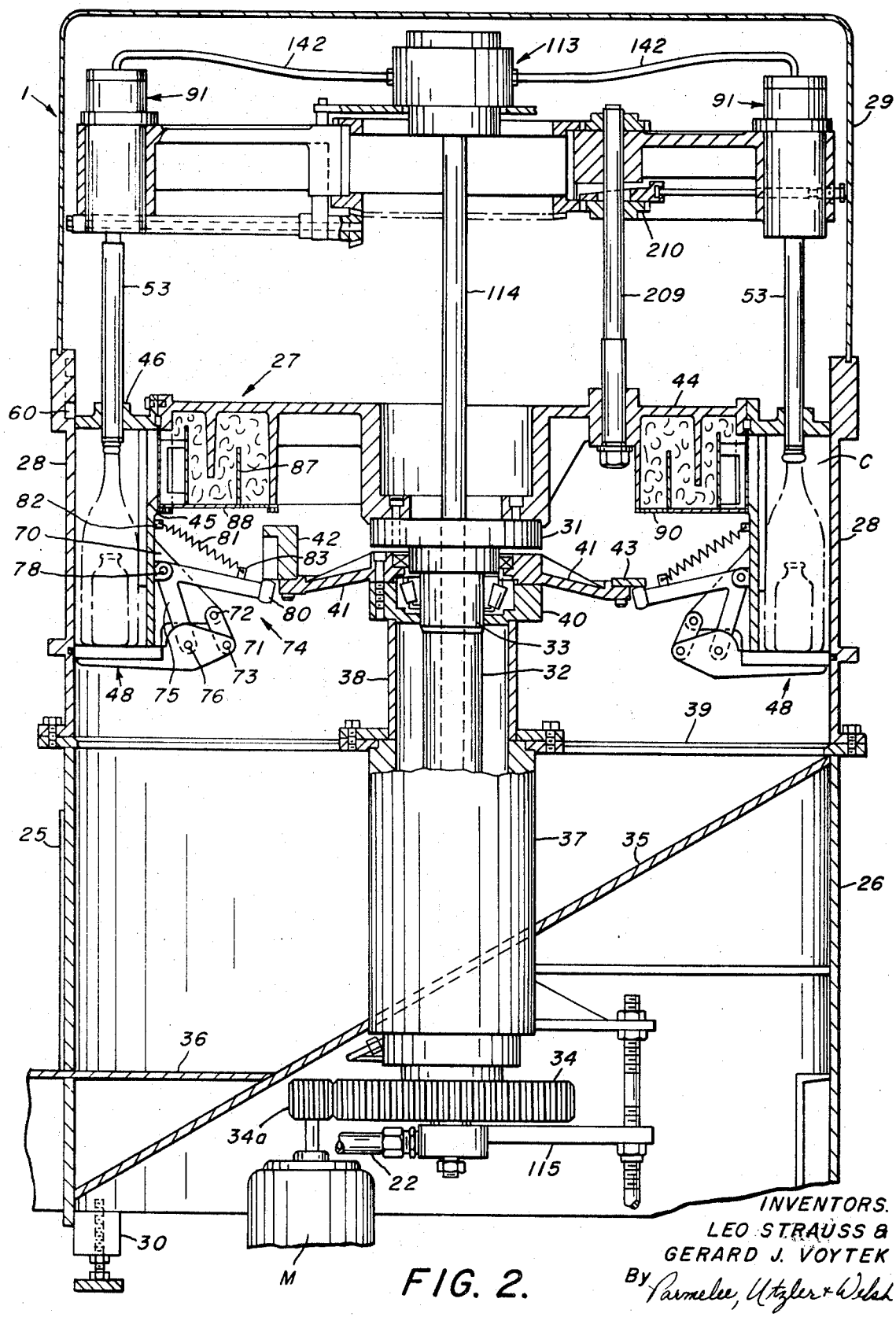
FIG. 2 is a partial cross-sectional view taken along the lines II—II of FIG. 1.

Means are also provided on the apparatus to adjust the height of the gasket L02 and filling head assembly, either head 91 of the basic apparatus or head 155 of the leak tester apparatus, relative to the bottom support 48 so that the apparatus is usable for testing various sizes of bottles. As illustrated in FIG. 2, one embodiment of such an adjustable means comprises a plurality of spaced jack screws 209 which connect the upper portion of the apparatus, including the air distribution system 113 and heads 91 with the turret 27. The jack screws, which include pinions 210, are so arranged that the upper portion is movable with the vertical distance between the filler head tubes 53 and bottom support 48 of the cells c is adjustable.

Referring to FIGS. 24, 25, 26 and 27 there is shown another embodiment of the invention incorporating an automatic means for identifying cells with bottles which fail to "pass" the leaker test aforedescribed and for automatically discarding such defective bottles.

Each of the cells c is provided with a rod cross bar member 211 which is affixed to the top of the leaker piston rod 182 which extends from each head of each cell, so that each cross bar member 211 rotates with its corresponding cell. Each cross bar hs mounted thereon a selected number of fixed switch-actuating members 212 here shown as upright buttons or studs. Each cross bar also carries a slidably mounted switch-actuating member 213 in the form of a friction detent, adapted to move vertically upward with the leaker piston rod 182, and remain in the "UP" position by reason of frictional engagement with the cross bar until subsequently reset to its "DOWN" position by a later described cam.

In the illustrated embodiment there are 25 cells and each cell is identifiable by a binary coded decimal number from 1 to 25. There is, therefore, required five bits or binary positions in order to identify each cell individually. Each fixed button 212 is arranged to occupy a binary position on the cross bar such that each button corresponds to a binary 1 and the absence of a button corresponds to a binary 0.

Mounted on the previously described air distributor there is a switch support means comprising a radial arm 214, which holds a switch array 215 positioned above the path of rotation of the cells and crossbars with the previously described switch-actuating buttons. Each switch contact is electrically connected to a binary-to-decimal decoder which actuates an indicator means, such as a light corresponding to a particular cell. If a cell contains no bottle or contains a leaker bottle, the cross bar 211 will be UP and the buttons carried thereby will contact the switches on the switch array 215 causing a light to go on corresponding to that cell whereby the operator has a visual indication of which cell caused the light. As that cell rotates past the switch array, the leaker piston rod and therefore the switch buttons 212 will go down as the cell completes its test cycle. The friction detent button 213, however, will remain in its UP position to actuate a bottle ejection solenoid at the appropriate time. Since the cell containing a leaker is not in position to eject the bottle therefrom upon first sensing the leaker, the bottle travels the normal discharge path outside the tester until it reaches a discharge station. Meanwhile, the cell in which the leaker was located continues to rotate to an ejection solenoid actuating station, which comprises a switch assembly 216 mounted on the radial arm 217 and mounting plate 218. The switch is electrically connected to a solenoid 219 located at the ejection station and having a movable pusher bar 18 which pushes the defective bottle off the conveyor. The linear distance from the switch array station to the eject station is the same as the linear distance from the switch array station to the ejection solenoid actuating station so that actuation of the solenoid switch is synchronized with the arrival of the defective bottle at the ejection station. The friction detent acts as a kind of "memory" which actuates the eject solenoid at the proper time. At the ejection solenoid station the friction detent 213, after actuating the solenoid 219 contacts a cam reset plate 220 which is mounted on switch mounting plate 218 by means of a pivot pin 221, and is biased by means of spring 222 to urge the plate into contact with the friction detent button. After passing the ejection solenoid station the cross bar 211 and all switch-actuating buttons 212 and 213 are in the down position, ready for another test cycle.

The switch array 215 and ejection solenoid switch assembly 216 will automatically move up and down with adjustments of the leak tester filling head 155 to accommodate various size bottles as was previously described.

Figure 26:
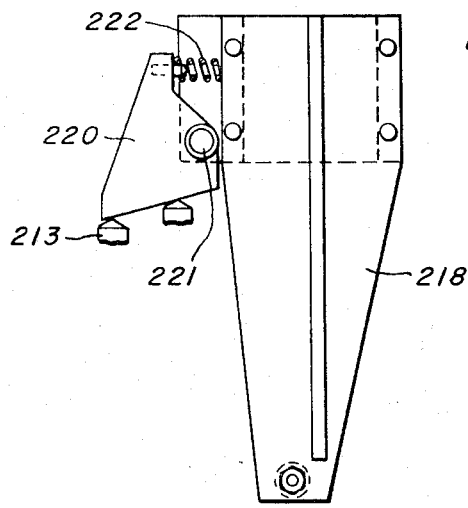
FIG. 26 is a detailed view of an injection switch assembly.

FIG. 26 illustrates the cell identification system in block diagram form. Switch array 215 is actuated by the buttons 212 and 213, fixed buttons 212 providing the cell identification and button 213 actuating a gate circuit 226 to enable the decoder 223 to pass the resulting signal to a timer 224, thence to the appropriate lamp on display panel 225. The timer holds the lamp on for a predetermined time interval, e.g., 5 seconds, in order to give an operator time to observe the lamp and identify its number. The time delay must, of course, be less than the time of one complete revolution of the cell. In this way, if a particular cell is repeatedly illuminated, it gives the operator an indication that that cell may be defective in some way rather than the bottles being tested in that cell. In the illustrated embodiment it is to be understood that there is a plurality of timers 224, each connected to the decoder and each connected to one of the indicator lamps on panel 225. In the described ejection system the ejection does not take place until the container is discharged from the tester in order to afford an opportunity for further inspection of defective containers. Such inspection may serve to identify a faulty mold or some other "upstream" problem which might not be discovered if the containers were simply discharged to a cullet collecting station before the opportunity for additional inspection.

There have been described a method and an apparatus for the pressure testing of containers, such as glass bottles, the testing carried out at high speed, high pressure and in a safe and economical manner. The containers are subjected to internal pressure in sealed cells with any fragments resulting from container breakage being automatically deposited into an enclosed chamber for subsequent removal. The pressurized fluid requirements are minimized through a recapturing and re-use of pressurized fluid remaining in good bottles after the test while the bottles are tested not only for flaws which might result in breakage thereof but also for defects which would result in leakage of pressurized fluid therefrom after the bottles are processed and filled.

We claim:

1. Apparatus for the pressure testing of containers, comprising,
   a. a rotatable turret having a series of container test cells around the periphery thereof each test cell having a bottom support upon which containers are rested and an outwardly facing opening for admitting and discharging containers,
   b. means for rotating the turret,
   c. a stationary housing around the turret arranged to form an outer wall for cell openings, the housing having a window therein for admitting and discharging containers into and out of the cells as the cells rotate past the window,
   d. means for introducing fluid under pressure into the containers resting in the cells during a selected portion of rotation of the turret, and
   e. means for exhausting pressurized fluid from the containers prior to their discharge from the cells.

2. An apparatus for the pressure testing of containers as defined in claim 1 wherein the bottom support upon which the containers rest includes a pivotable trap-door which forms a portion of the cell.

3. An apparatus for the pressure testing of containers as defined in claim 2 wherein means are provided for locking said trap-door in closed position for resting of containers thereon at the portion of rotation of the turret during which the containers are admitted and discharged from the housing.

4. An apparatus for the pressure testing of containers as defined in claim 3 wherein said pivotable trap-door includes a linkage arranged to restrain the trap-door in closed position when a container is resting thereon and said means for introducing fluid under pressure to the containers is in contact with the container.

5. An apparatus for the pressure testing of containers as defined in claim 4 wherein said linkage is arranged to automatically open said trap-door and discharge container fragments from said cell upon breakage of a container resting thereon.

6. An apparatus for the pressure testing of containers as defined in claim 3 wherein said means for locking said trap-door in closed position comprises a roller cam, the roller of which contacts a cooperative cam surface.

7. An apparatus for the pressure testing of containers as defined in claim 1 wherein each test cell contains vertically slidable side walls, which side walls are in contact with said bottom support to seal the individual cells from other cells around the periphery of the turret.

8. An apparatus for the pressure testing of containers as defined in claim 7 including means for raising said side walls a predetermined distance during admitting and discharging containers from the cells and means which pass below said raised side walls, adjacent the window, for admitting and discharging containers from the cells.

9. An apparatus for the pressure testing of containers as defined in claim 8 wherein each test cell includes a stationary rear wall, the rear wall having guide means for raising of the side walls, and the side walls carry a rolling cam, which cam follows a track in the inside surface of said stationary housing, whereby a change in height of the track effects raising and lowering of the side walls.

10. An apparatus for the pressure testing of containers as defined in claim 1 wherein each cell has a stationary rear wall, including baffle means attached to the turret and interconnected with the rear wall, said baffle means arranged to exhaust pressurized fluid from said cell upon breakage of a container therein while muffling the sound caused by such breakage and removing container fragments from the exhausted fluid prior to discharge of the fluid to the atmosphere.

11. An apparatus for the pressure testing of containers as defined in claim 1 including pressurized fluid recovery means for transferring a portion of the pressurized fluid from a container, prior to exhausting the fluid therefrom, to a subsequent container prior to introducting pressurized fluid to said subsequent container.

12. An apparatus for the pressure testing of containers as defined in claim 11 wherein a plurality of successive said pressurized fluid recovery means are provided, including means for first transferring pressurized fluid from a first container about to be exhausted to a subsequent container and means for a second transferring of pressurized fluid from a container immediately following the first container to the subsequent container.

13. An apparatus for the pressure testing of containers as defined in claim 1 including pressurized fluid distribution means for distributing pressurized fluid from a source thereof to individual said means for introducing fluid under pressure into the containers resting in the cells.

14. An apparatus for the pressure testing of containers as defined in claim 13 wherein the pressurized fluid distribution means comprises a pair of contiguous rings, one of said pair of rings being stationary and the other of said pair rotatable with said turret, the rings having fluid passage means therein through which fluid from said source is directed to said means for introducing fluid under pressure into the containers at predetermined points of rotation of the turret.

15. An apparatus for the pressure testing of containers as defined in claim 14 wherein said one ring contains fluid passage means which communicate with said pressurized fluid source and said other ring contains individual ports therethrough, each port of which communicates with a respective means for introducing fluid under pressure into containers of individual cells.

16. An apparatus for the pressure testing of containers as defined in claim 1 wherein said means for introducing fluid under pressure into the container comprises a vertically slidable hollow tube arranged to contact and seal the lip of a container resting in a cell and valve means for controlling the flow of pressurized fluid through the tube and into the container.

17. An apparatus for the pressure testing of containers as defined in claim 16 including a housing, which housing encases the upper portion of said slidable tube; a tube opening connecting the hollow portion of the tube with the interior of the housing; a flange on said tube and a reciprocable spool disposed around said tube; said flange tube opening and spool contained within the housing; and means for directing pressurized fluid to be introduced into said container on said flange, whereby, upon initial impact of pressurized air upon the flange, the tube and spool are urged downwardly until the tube contacts a container resting in the cell, while the spool is further urged downwardly to direct the pressurized air through the tube opening and the hollow tube into a container.

18. An apparatus for pressure testing of containers is defined in claim 17 wherein the flange, tube opening and spool are so arranged that if the tube, upon downward urging, does not contact a container within the cell, the flange and spool are contiguious and pressurized air is prevented from entering the tube opening and hollow portion of the tube.

19. An apparatus for the pressure testing of containers as defined in claim 17 including resilient means to urge said tube upwardly when there is no pressurized fluid directed on said flange.

20. An apparatus for the pressure testing of containers as defined in claim 16 including:
  a. means for sealing said container from the source of pressurized fluid following introduction of a predetermined amount of pressurized fluid into the container,
  b. a pressure responsive indicating means, and
  c. means for connecting the pressurized fluid contained within the container with the pressure responsive indicating means whereby reduction of the pressure within a container through leakage of the pressurized fluid to the atmosphere with actuate said pressure responsive indicating means.

21. Apparatus as defined in claim 16 including:
  a. means for sealing said container from the source of pressurized fluid following introduction of a predetermined amount of pressurized fluid into the container,
  b. actuating means carried by each cell and responsive to the pressure in the container and having a first position when the container retains a predetermined pressure therein and a second position when the container fails to retain the predetermined pressure,
  c. switch means mounted on the housing and activated by the actuating means when the latter is in the second position as the cell rotates past the switch means, and
  d. indicator means operatively connected to the switch means.

22. Apparatus as defined in claim 21 wherein the actuating means comprises:
  a. a predetermined number of switch engaging members engaged to provide a coded identity unique to each cell,
  b. the switch means comprises a plurality of switches sufficient in number and arrangement to satisfy the requirements of the code, and
  c. decoder means operatively connected to the switch means and to the indicator means.

23. Apparatus as defined in claim 16 including:
  a. means for sealing said container from the source of pressurized fluid following introduction of a predetermined amount of pressurized fluid into the container,
  b. actuating means carried by each cell and responsive to the pressure in the container and having a first position when the container retains a predetermined pressure therein and a second position when the container fails to retain the predetermined pressure,
  c. ejection switch means mounted on the housing and activated by the actuating means when the latter is in the second position,
  d. conveyor means for moving containers discharged from the housing, and
  e. ejection means operatively connected to and responsive to the activation of the ejection switch for ejecting discharged containers which have failed to retain the predetermined pressure.

24. An apparatus for the pressure testing of bottles comprising:
  a. a rotatable turret having a series of bottle test cells around the periphery thereof, each cell being formed by
    1. a bottom support upon which the bottles are rested
    2. a pair of vertically movable side walls, and
    3. rear and top walls; the cells having an outwardly facing opening for admitting and discharging bottles therefrom;
  b. means for rotating the turret;
  c. a stationary housing around the turret arranged to form an outer wall, the housing having a window therein for admitting and discharging bottles into and out of the cells as the cells rotate past the window,
  d. means for introducing air under pressure into the bottles resting in the cells during a selected portion of rotation of the turret, with the stationary housing bottom support, pair of side walls and top and bottom walls arranged to seal the contents of the cell from the surrounding area during that selected portion of rotation, and
  e. means for exhausting pressurized fluid from the bottles prior to their discharge from the cells.

25. An apparatus for the pressure testing of containers as defined in claim 24 wherein the bottom support upon which the bottles rest includes a support means and a pivotable door, arranged such that the bottles rest on the door; and means for pivoting said door downwardly upon breakage of the bottle resting within the cell to discharge resulting bottle fragments therefrom.

26. An apparatus for the pressure testing of containers as defined in claim 25 including a pressurized air transfer means for transferring a portion of the air from a bottle, prior to exhausting the bottle, to a subsequent bottle that is to about to have pressurized air introduced thereto.

27. A method of pressure testing containers to determine whether the containers are resistant to breakage when subjected to a predetermined internal pressure, while continuing movement of the containers from a source of containers to a distant area comprising:
  a. admitting successive containers into a series of sealable test cells arranged around the periphery of a rotating turret by placement of individual containers on bottle support members of individual said sealable test cells, b. sealing the test cells from the surrounding area while continuing rotation of the turret, c. subjecting the containers to a predetermined internal pressure by introducing a pressurized fluid into the containers, d. maintaining the pressurized fluid within the containers for a predetermined period of rotation of the turret, e. transferring pressurized fluid from a container to a further container prior to subjecting the further container to the predetermined internal pressure, f. exhausting the pressurized fluid from the containers, g. individually opening the test cells following the exhaustion of pressurized fluid from the containers placed therein, and h. discharging the containers from the test cells for continued movement to the distant area while continuing rotation of the turret.

28. The method as defined in claim 27 wherein the pressurized fluid is air.

29. The method as defined in claim 28 wherein the predetermined internal test pressure is between about 170 to 230 pounds per square inch.

30. The method as defined in claim 28 wherein the predetermined period of rotation of the turret is carried out during a time period of about 2–5 seconds.

31. The method as defined in claim 28 wherein the containers comprise glass bottles.

* * * * *